United States Patent [19]

Metz et al.

[11] Patent Number: 5,666,293

[45] Date of Patent: Sep. 9, 1997

[54] DOWNLOADING OPERATING SYSTEM SOFTWARE THROUGH A BROADCAST CHANNEL

[75] Inventors: Erik C. Metz, Bowie; Henry G. Hudson, Jr., Annapolis, both of Md.; John W. Darr, Jr., Great Falls, Va.

[73] Assignee: Bell Atlantic Network Services, Inc., Arlington, Va.

[21] Appl. No.: 498,265

[22] Filed: Jul. 3, 1995

Related U.S. Application Data

[63] Continuation-in-part of Ser. No. 380,755, Jan. 31, 1995, and Ser. No. 250,791, May 27, 1994.

[51] Int. Cl.⁶ .................................................. H04H 1/00
[52] U.S. Cl. ..................... 395/200.5; 455/3.1; 455/4.1; 455/4.2; 455/5.1; 348/7; 348/10; 348/12
[58] Field of Search .................. 364/514 C; 380/10, 380/20; 370/112, 118; 348/7, 10, 12; 455/3.1, 4.1, 4.2, 5.1, 6.1

[56] References Cited

U.S. PATENT DOCUMENTS

| | | |
|---|---|---|
| Re. 34,611 | 5/1994 | Fenwick et al. . |
| 4,506,387 | 3/1985 | Walter . |
| 4,527,194 | 7/1985 | Sirazi . |
| 4,623,905 | 11/1986 | Ichihashi et al. . |
| 4,623,920 | 11/1986 | Dufresne et al. . |
| 4,677,685 | 6/1987 | Kurisu . |
| 4,700,386 | 10/1987 | Kohn . |
| 4,706,121 | 11/1987 | Young . |
| 4,709,418 | 11/1987 | Fox et al. . |
| 4,712,239 | 12/1987 | Frezza et al. . |
| 4,816,905 | 3/1989 | Tweedy et al. . |
| 4,829,372 | 5/1989 | McCalley et al. . |
| 4,894,714 | 1/1990 | Christis . |
| 4,912,552 | 3/1990 | Allison, III et al. . |
| 4,920,432 | 4/1990 | Eggers et al. . |
| 4,947,244 | 8/1990 | Fenwick et al. . |
| 4,949,187 | 8/1990 | Cohen . |
| 4,963,995 | 10/1990 | Lang . |
| 4,982,430 | 1/1991 | Frezza et al. . |
| 5,003,591 | 3/1991 | Kauffman et al. ................. 380/10 |
| 5,010,499 | 4/1991 | Yee . |
| 5,027,400 | 6/1991 | Baji et al. . |

(List continued on next page.)

FOREIGN PATENT DOCUMENTS

| | | |
|---|---|---|
| 3149992 | 6/1991 | Japan . |
| 01-288421 | 9/1991 | Japan . |
| 94/23537 | 10/1994 | WIPO . |

OTHER PUBLICATIONS

Hambley, Allan R., "Communication Systems", pp. 8–10 1990.

Gelman et al., A Store–and–Forward Architecture for Video–on–Demand Service, International Conference on Communications, Denver, Jun. 23, 1991; Communications: Rising to the Heights; vol. 2 of 3; pp. 842–846.

*Primary Examiner*—Ellis B. Ramirez
*Assistant Examiner*—Patrick Assouad
*Attorney, Agent, or Firm*—Lowe, Price, LeBlanc & Becker

[57] ABSTRACT

Set-top terminals utilized in broadband broadcast networks are becoming increasingly intelligent. Upgrading the operation of such terminals periodically requires upgrading the software, particularly the operating system, of the programmable processor which controls the terminal operation. To facilitate frequent upgrades, the network will carry a cyclic broadcast of a packetized data file containing the operating system. Periodically, a terminal will capture and store the broadcast operating system. In the preferred embodiment, the broadcast includes operating system files for a number of different terminal types and data identifying the current broadcast version of the operating system for each type of terminal. The terminal will check the broadcast version number for its terminal type operating system. If the broadcast version number differs from the version number for the operating system the terminal currently is running, then the terminal will capture only the file containing the operating system for the corresponding terminal type.

45 Claims, 9 Drawing Sheets

U.S. PATENT DOCUMENTS

| | | |
|---|---|---|
| 5,051,822 | 9/1991 | Rhoades . |
| 5,057,932 | 10/1991 | Lang . |
| 5,058,160 | 10/1991 | Banker et al. . |
| 5,104,125 | 4/1992 | Pocock et al. . |
| 5,105,268 | 4/1992 | Yamanouchi et al. . |
| 5,119,188 | 6/1992 | McCalley et al. . |
| 5,121,476 | 6/1992 | Yee . |
| 5,130,792 | 7/1992 | Tindell et al. . |
| 5,132,992 | 7/1992 | Yurt et al. . |
| 5,133,079 | 7/1992 | Ballantyne et al. . |
| 5,136,411 | 8/1992 | Paik et al. . |
| 5,140,417 | 8/1992 | Tanaka et al. . |
| 5,142,680 | 8/1992 | Ottman et al. . |
| 5,166,886 | 11/1992 | Molnar et al. . |
| 5,168,353 | 12/1992 | Walker et al. . |
| 5,172,413 | 12/1992 | Bradley et al. . |
| 5,181,107 | 1/1993 | Rhoades . |
| 5,189,673 | 2/1993 | Burton et al. . |
| 5,192,999 | 3/1993 | Graczyk et al. . |
| 5,223,924 | 6/1993 | Strubbe et al. . |
| 5,231,494 | 7/1993 | Wachob . |
| 5,239,540 | 8/1993 | Rovira et al. . |
| 5,247,347 | 9/1993 | Litteral et al. . |
| 5,247,364 | 9/1993 | Banker et al. . |
| 5,249,044 | 9/1993 | Von Kohorn . |
| 5,253,275 | 10/1993 | Yurt et al. . |
| 5,282,028 | 1/1994 | Johnson et al. . |
| 5,315,392 | 5/1994 | Ishikawa et al. . |
| 5,317,391 | 5/1994 | Banker et al. . |
| 5,335,277 | 8/1994 | Harvey et al. . |
| 5,341,425 | 8/1994 | Wasilewski .............................. 380/20 |
| 5,341,474 | 8/1994 | Gelman et al. . |
| 5,373,288 | 12/1994 | Blahut . |
| 5,379,421 | 1/1995 | Palazzi, III et al. . |
| 5,400,401 | 3/1995 | Wasilewski ................ 380/9 |
| 5,410,326 | 4/1995 | Goldstein . |
| 5,418,782 | 5/1995 | Wasilewski ............................. 370/73 |
| 5,421,017 | 5/1995 | Scholz et al. . |
| 5,440,632 | 8/1995 | Bacon et al. ............................ 380/20 |
| 5,441,389 | 8/1995 | Blahut et al. . |
| 5,448,568 | 9/1995 | Delpuch et al. ................ 372/94.2 |
| 5,548,532 | 8/1996 | Menand et al. ................ 364/514 C |
| 5,553,311 | 9/1996 | McLaughlin et al. ................ 395/884 |
| 5,563,648 | 10/1996 | Menand et al. ............................. 348/13 |

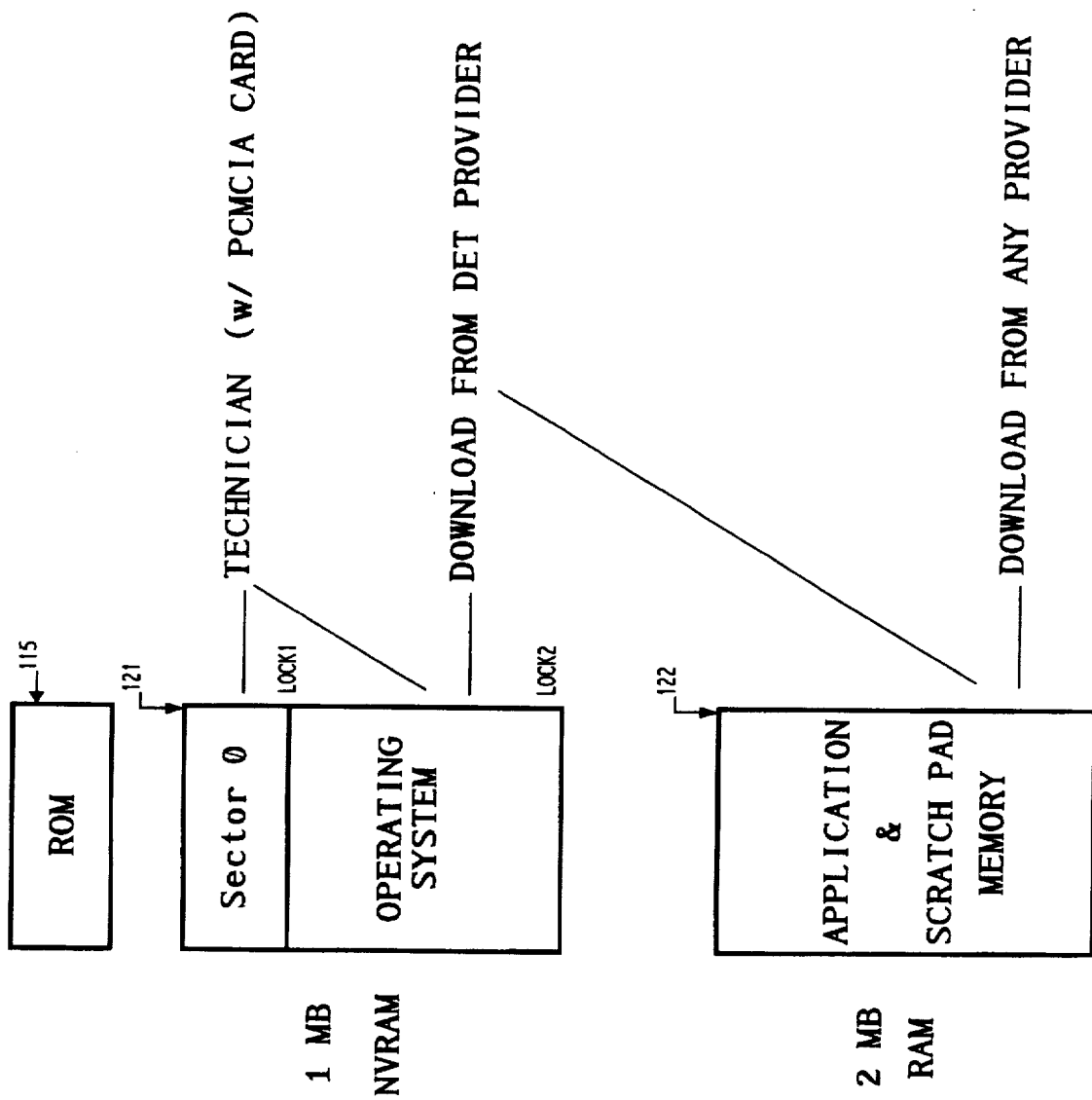

DOWNLOADING OPERATING SYSTEM SOFTWARE THROUGH A BROADCAST CHANNEL

CROSS REFERENCE TO RELATED APPLICATION

This application is a Continuation-In-Part of U.S. patent application Ser. No. 08/380,755 filed Jan. 31, 1995 which is a Continuation-In-Part of U.S. patent application Ser. No. 08/250,791 filed May 27, 1994, the disclosures of both of which are incorporated herein entirely by reference.

TECHNICAL FIELD

The present invention relates to a programmable set-top terminal, typically comprising a network interface module (NIM) and a digital entertainment terminal (DET), for use in digital video program distribution networks and to systems and methods for dynamically downloading operations system software to such a terminal.

Background Art

Set top terminal devices commonly in use in cable television systems today have a number of limitations. First, the devices are limited to processing of analog television signals. Also, cable television terminal devices are generally "dumb" devices having a limited set of functionalities constrained by the hard wired programming of the internal micro-processor controlled device. Essentially all cable television terminal devices respond to a selection input from the subscriber, tune to a selected channel available on the cable television network, decode the video program material if scrambled, and provide output signals compatible with a standard television receiver.

Enhanced cable television terminals provide some additional features, such as graphics overlay capability and two way communication of control signalling to and from headend terminal devices. Although such improved terminals facilitate some enhanced services, such as home shopping and purchasing, the performance of these cable television set-top terminals is still limited to analog decoding. Also the range of services is still limited by the hard wired capabilities of the microprocessor within the set-top terminal devices.

Proposals have been made to download computer executable code over cable television networks. In particular, U.S. Pat. Nos. 5,051,822 and 5,181,107 both to Rhoades disclose a terminal device connectable to a cable television network and a telephone line. A subscriber requests a video game or other software stored in a remotely located software storage center by operating the terminal to establish a bi-directional telephone link with the remote storage center. The center transmits the encoded software program together with the terminal identification code as a digital bit stream over a television broadcast channel. The terminal requesting the software monitors all digital bit streams on the broadcast channel but receives only the software program addressed to it, i.e. only after identification code validation occurs. Once reception of all the software data is complete, the terminal acknowledges receipt to the remote storage center and drops the telephone line. The encoded software program is decoded, and the terminal provides a display informing the subscriber that the game or other program is ready for use. The terminal also offers the subscriber the means to interact with the software, e.g. play the game, using contemporary gaming control or input devices. While the Rhoades terminal structure does provide enhanced capabilities, such as video games and home shopping, the display functionality controlled by the downloaded software is limited to computer displays generated in response to the software, there is no direct interaction of the received software with any video program carried on the cable network. The downloaded software does not control further interactions with the storage center. Also, the video transmissions on the cable system are analog, and a separate telephone connection is required for selection inputs to the central storage facility. Furthermore, the terminal device apparently can receive software from the storage center of only one service provider.

Some prior art systems do permit downloading into the cable television decoder itself, however, it is believed that this downloading of information into the decoder has been limited to information controlling the decoding of the television program signals, e.g. a key word used in a descrambling algorithm. Dufresne et al., in U.S. Pat. No. 4,623,920 teach a specific scheme for addressing data transmissions over a cable television network to groups of terminals or to individual terminals. The addressed data sent from the head end can include an option table of signals for controlling descrambling of available television programs, data to enable operation of a cable TV converter, or software for operating a peripheral microcomputer separate from the cable television terminal device. The Dufresne et al. terminal is limited to reception of data from only one service provider, i.e. the provider operating the cable TV network. Also, the services provided through the terminal are limited in that the downloaded data apparently does not alter or control the terminal functionality for further interactions with the provider through the network.

Recently, several different wideband digital distribution networks have been proposed for offering subscribers an array of video services, such as Video On Demand. The following U.S. Pat. Nos. disclose representative examples of such digital video distributions networks: 5,253,275 to Yurt et al., 5,132,992 to Yurt et al., 5,133,079 to Ballantyne et al., 5,130,792 to Tindell et al., 5,057,932 to Lang, 4,963,995 to Lang, 4,949,187 to Cohen, 5,027,400 to Baji et al., and 4,506,387 to Walter. The terminal devices in these digital networks are still limited functionality devices. In these networks, the digital terminal devices still only receive selection inputs, transmit selection signals upstream to the source of the video materials, receive downstream video transmissions, decompress the digitized video materials and convert to analog form, and provide appropriate signals to a television receiver. One example of such a digital video distribution network and the terminal device for such a network, disclosed in Litteral et al. Pat. No. 5,247,347, will be described in more detail below.

U.S. Pat. No. 5,247,347 to Litteral et al. discloses an enhanced public switched telephone network which also provides a video on demand service to subscribers over the public switched telephone network. A menu of video programming information is displayed at the subscriber's premises by a set-top terminal and a TV set. The subscriber may transmit ordering information via the public switched telephone network to the independent video information providers. Video programming may be accessed and transmitted to the subscriber directly from a video information provider (VIP) or through a video buffer located at a central office (CO) serving the subscriber.

Connectivity between the central office and the subscriber for transmission of video data is provided by an asymmetrical digital subscriber line (ADSL) system. ADSL interface units at the central office multiplex digital video information with voice information to be transmitted to the subscriber and support two-way transmission between the subscriber's line and the X.25 packet data network of one or more control channels. A complimentary ADSL interface unit at the subscriber's premises separates downstream video control signals and voice telephone signals from the line and multiplexes upstream control signals and voice telephone signals onto the line. The ADSL interface on the subscriber premises supplies the broadband digital data stream recovered from the transmission over the subscriber loop to a decoder unit in the set-top terminal. The decoder unit decompresses the audio and video data, and converts the digital audio and video to corresponding analog signals. The decoder can supply baseband analog audio and video signals to a television receiver, or these analog signals can be modulated to a standard television channel frequency for use by the television receiver.

The above detailed discussion of the Litteral et al. system shows that prior art digital distribution networks offer enhanced video services, but the terminal device functionality is still limited to program selection, decoding and display.

A number of suggestions have been made in the press regarding arrays of different services which will become available through broadband digital networks now popularly referred to as the "Information Super Highway". If a different VIP were to offer a different service, the VIP can limit the service to an interactivity with the subscriber essentially corresponding to the functionality available in the terminal device. This approach, however, limits the functional capabilities the new VIP may choose for the different service. Alternatively, the subscriber must buy another terminal device programmed or wired to function in accord with the VIP's new service. This second approach, however, forces the subscriber to purchase and connect up a different terminal device for each different service subscribed to.

From the above discussion it becomes clear that a need exists in the art for set-top terminal devices which process compressed, broadband digital audio/video information and are readily adaptable to perform a variety of related functionalities, as needed to facilitate a range of audio/video and interactive services offered by a large number of information providers.

In the 08/250,791 grandparent application cited above, it was suggested that software could be downloaded into the digital set-top terminal through a point-to-point connection through a digital broadband network, e.g. similar to that of Litteral et al. As disclosed therein, the software included at least customized applications programs for controlling terminal operation in a manner specified by an individual information provider. It was also suggested that at least one party would operate a server to download operations system upgrades through a point-to-point connection. Point-to-point connections through broadband digital networks are relatively expensive, and some digital networks under development will have broadcast channels, but at least initially, will not offer point-to-point connections. The disclosure in the 08/250,791 application did not address problems of downloading software to terminals through digital broadcast networks.

In the 08/380,755 parent application cited above, it was suggested that software, specifically software related to channel mapping functionalities and navigation through broadcast services, could be downloaded into the digital set-top terminal through a data carousel type cyclical broadcast. Such downloaded software consisted of one or more applications intended for wide general availability. The digital type set-top devices receiving such software were intended as open interface devices to which any provider offering such a download service could download the relevant data and executable code.

An operating system includes programming to control internal operations of the control processor, such as those necessary to execute specific types of communications over the network, graphics drivers, etc. The operating system typically allows the set-top to run a variety of downloaded applications programs, preferably made available by a number of service providers. It is desirable to periodically update the operating system software, as improvements are developed, without having a technician manually service each terminal. The downloading of an operating system program for running the terminal device raises a more complicated set of problems relating to who can download such software to which types of terminals.

Access to the ability to modify the operating system must be carefully controlled. If access were open, an unscrupulous party could write a destructive operating system, e.g. that would allow the terminal to access only one provider's services or that might cause the terminal to begin upstream transmissions in some manner which would disrupt upstream transmissions of other terminals. The downloaded operating system would need to correspond to the particular type of set-top terminal to insure compatibility. Also, the downloading of the operating system must be particularly error free to insure that errant reception and overwriting of operation system software does not in some corrupt or disable terminal operation.

A need therefore still exists to reliably and securely download operating system software to the digital set-top terminal through a widely accessible broadcast channel.

DISCLOSURE OF THE INVENTION

The present invention addresses the above noted needs by providing methods, systems and terminal device structures for downloading operating system software to programmable set-top terminal devices through digital broadcast channels.

In one aspect, the invention contemplates a set-top terminal device to which new operating system software can be downloaded through one of the broadcast channels. The terminal device includes a network interface module. This module couples the terminal to a communication network. From the network, the interface module receives at least selected ones of a plurality of broadcast digital broadband channels. One or more of the broadcast channels carries audio/video program information in compressed, digital form in packets of a standardized format. Also, one of the broadcast channels carries cyclically repetitive transmissions of the operating system software in packets of the standardized format.

The set-top terminal also includes a digital entertainment terminal. The digital entertainment terminal includes an audio/video processor for processing the compressed, digital audio/video program information from a selected broadcast channel. The digital entertainment terminal also includes a memory and a remote control or the like for supplying inputs from a user to the digital entertainment terminal. A control processor captures the operating system software from one of the selected digital broadband channels. The control processor loads the captured operating system software into the memory and begins operation in accord with the operating system software. For example, using the operating system software in the memory, the control processor controls the network interface module and the audio/video processor in response to the user inputs.

Another aspect of the invention relates to a communication system including a network for broadcasting the channels to a plurality of terminals, similar to the set-top terminal discussed above. This system includes a source system supplying program material and software for broadcast through a digital network. The source system comprises a program source supplying a broadband program signal and a software server cyclically outputting a data file containing an operating system. An encoder system packetizes the broadband program signal and the data file in digital packets of the standard format.

In the preferred implementation, the encoder processes analog audio/video signals to digitize, compress and packetize the program information in accord with the moving pictures expert group (MPEG) standard. The preferred network utilizes Asynchronous Transfer Mode (ATM) transport. The encoder system therefore includes an ATM multiplexer for adapting the MPEG packets into ATM cells and combining ATM cells from one or more programs together with ATM cells containing the operating system into a stream for transport through the ATM broadcast network.

As digital networks develop and remain in wide use over a period of time, the set-top terminal device will essentially become a piece of consumer electronics equipment. At such a time, different end users will obtain set-top terminals of different types from a number of different providers and will connect different types of set-top terminals to the same digital network. Different types of set-top terminals will utilize different operating systems. A further aspect of the invention therefore relates to broadcasting a plurality of different operating systems for correspondingly different types of set-top terminals. Each type of set-top terminal will identify the correct operating system from among the plurality broadcast and capture only that operating system.

Another feature of the invention relates to identification of the need for a particular set-top terminal to upgrade its operating system. Specifically, each operating system for a particular type of set-top terminal has a version number. The set-top terminal stores a version number for the operating system that it currently is running, and the broadcast data stream will include data identifying the version number of the operating system being broadcast for the particular type of terminal. The set-top terminal actually captures an operating system from the broadcast if the broadcast version number is different (e.g. higher or lower) than the number of the version that terminal is currently running.

In accord with the present invention, the operating system upgrade process can begin automatically, or a user can manually trigger the upgrade process. For automatic activation, a processor in the set-top terminal will monitor some periodic occurrence, such as the passage of some time interval or cycles of turn-off by a user. For manual activation, the user may call up a menu display by the set-top terminal and select the operating system upgrade from the menu.

Applications software can be downloaded to the set-top via the network. The set-top may capture a desired application from a digital broadcast channel in a manner similar to that used to acquire the new operating system. Alternatively, the user may establish a point-to-point broadband call to an interactive service provider's system, in which case, the service provider's system downloads an application to control further interactivity via the point-to-point link.

The present invention may be utilized on a variety of different types of broadcast networks, particularly those carrying digitized and compressed broadcast programming. Several networks are cited, and a preferred network is disclosed in detail. The preferred digital network includes a system of optical fibers for broadcasting the digital packets from the encoder system to a plurality of host digital terminals. Each host digital terminal routes selected digital broadcast channels to a group set-top terminals connected thereto.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 7 shows a memory layout for the digital entertainment terminal and an associated diagram of functions involved in memory management and software downloading in accord with the present invention.

BEST MODE FOR CARRYING OUT THE INVENTION

Figure 1:
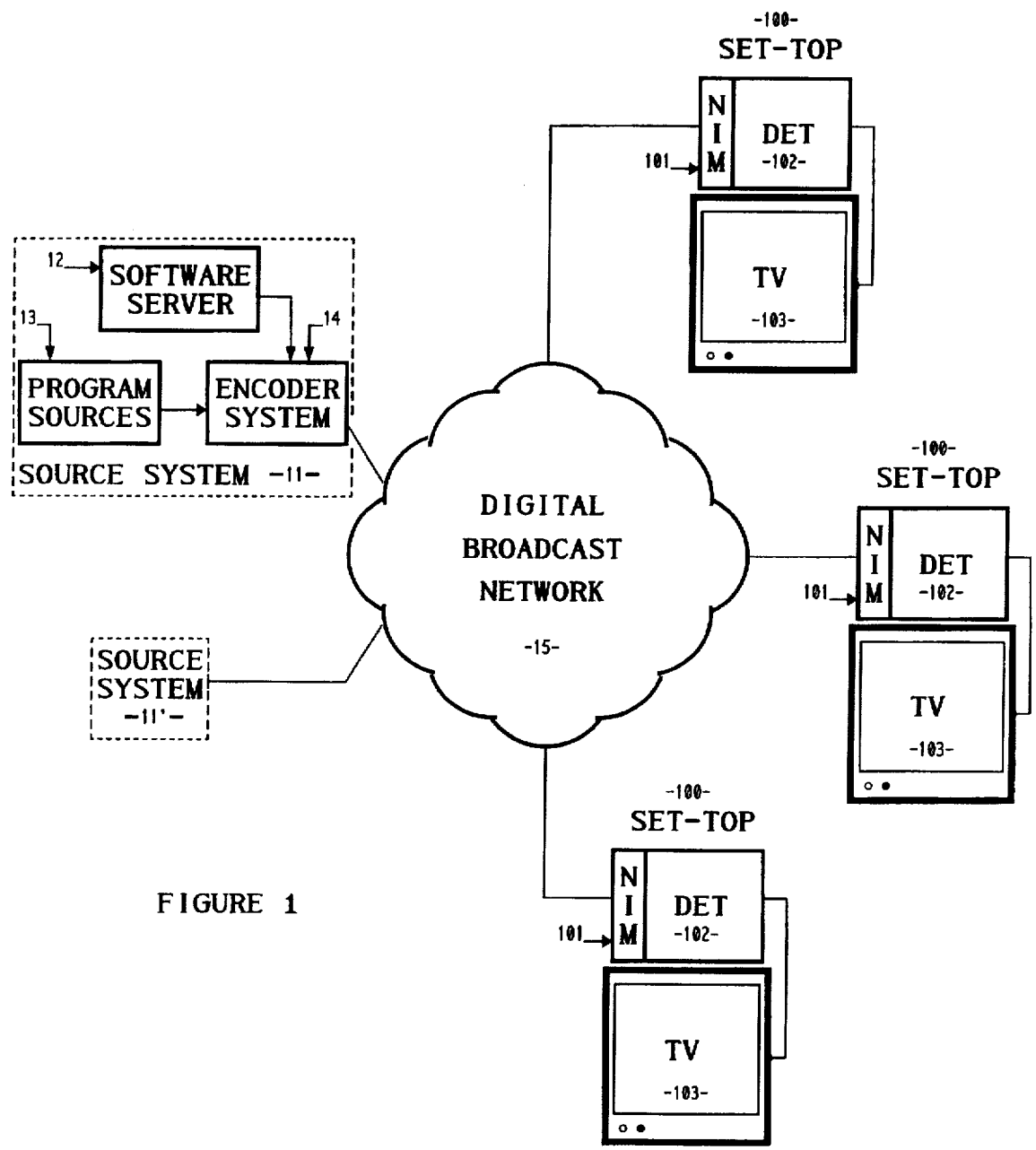
FIG. 1 illustrates a digital broadcast system utilizing the operating system download of the present invention.

In the digital broadband networks of type under consideration here, each user has a set-top terminal device 100 (FIG. 1). The set-top device 100 includes a digital entertainment terminal (DET) 102 and a network interface module (NIM) 101.

With the present invention the set-top terminal 100 (preferably the DET portion 102 thereof) receives and stores downloaded operating system software and application software. The terminal 100 can establish a point to point link to interactive equipment operated by a video information provider (VIP) and receive interactive applications software through the point to point link, as disclosed in the above incorporated 08/250,791 application. The key features of the present invention, however, relate to downloading an operating system through a broadcast channel, therefore the following description concentrates on a broadcast type network implementation and downloading of the operating system through a broadcast channel.

FIG. 1 is a high level functional diagram of a network providing digital broadcast services, preferably using ATM cell transport. The preferred embodiment illustrated in FIGS. 8A and 8B and discussed later utilizes end-to-end ATM transport, i.e. with ATM cells for at least the downstream broadband transmissions going all the way to the set-top terminal devices 100. Other networks which may carry the operating system download in accord with the present invention, such as the hybrid-fiber-coax network shown in FIG. 4 of U.S. patent application Ser. No. 08/304, 174, utilize ATM transport in a backbone portion of the network only and use some other transport technology for local loop distribution to the subscriber's terminal device. The software downloading techniques of the present invention can be applied to other such digital broadcast networks.

FIG. 1 therefore provides a generic illustration of the broadcast network 15. As shown, the network 15 receives digitized data streams, preferably in ATM cell format, from one or more sources 11 operated by one or more information providers. In the later discussed preferred embodiment, local loop distribution utilizes switching nodes referred to as host digital terminals (HDT's) which transport ATM cell streams through to the relevant subscribers' set-top terminals 100. In some forms of the network 15, local loop distribution nodes may strip off the ATM cell headers and convert the payload data to some other format for actual transmission to the subscriber terminals. In the preferred embodiment, the local loop distribution network supplies the ATM cells from each broadcast to each set-top terminal 100 from which a subscriber requested the particular broadcast service.

Material intended for broadcast through the network is encoded and packetized in accord with a specified protocol or standard, such as DIGICIPHER™. The preferred embodiments utilize MPEG (moving pictures expert group) encoding. The source system 11 includes one or more program sources 14 and an encoder system 13 for encoding the program material in the desired standard format. Where the network utilizes another transport protocol such as ATM, the encoder also adapts the encoded information to the format utilized on the network 15. In accord with the present invention, the source system 11 also includes a software server which supplies data to the encoder 14.

As shown, a number of source systems 11, 11' supply digitized material to the digital network 15 for broadcast. One service provider may operate a number of the source systems to provide a desired number of broadcast programs or channels. Also, the network may offer a 'video dial tone' type service whereby a plurality of video information providers (VIPs) separately supply their own programming from one or more such sources. In the simplified example shown in FIG. 1, source system 11 offers a plurality of broadcast programs from sources 13 and broadcasts software for the downloading service. Other source systems such as system 11' may be identical to system 11 and offer both broadcast programming and software downloading, but most of the other systems 11' will offer only broadcast programming. Source systems offering broadcast programs only will be similar in structure and operation to the system 11 discussed below in more detail with regard to FIG. 2, but those systems 11' will not include the software server and the associated element(s) of the encoder for processing the software.

In normal operation, the broadcast network supplies at least a selected program channel to the set-top terminal 100. The set-top terminal processes information from the selected channel to produce signals capable of presenting information from that channel to a user in humanly perceptible form, e.g. to drive a standard television set 103 to display selected video programming. The NIM 101 provides the actual physical connection to the network and the transport protocol processing (e.g. ATM). The DET 102 performs the actual decoding to produce the output signals from the information. The DET 102 also includes the primary intelligent control processor for overall control of the operation of the set-top terminal 100.

The DET portion of the set-top device 100 includes a non-volatile random access memory (shown in detail in FIG. 6), for example consisting of electrically erasable programmable read only memory (EEPROM) or flash memory. The non-volatile RAM stores the operating system for the set-top device 100. The operating system defines the basic functionality of the set-top 100. For example, the operating system controls how the microprocessor of the DET 102 interprets application programs. The operating system includes the various driver routines permitting the microprocessor to operate the other elements of the set-top 100. The operating system also includes the basic or 'resident' application under which the DET operates when not running a downloaded application. The resident application preferably emulates a cable television type program reception type user interface for the particular network to which the set-top 100 connects.

One item stored in the non-volatile memory is a channel identifier for a network program channel that will carry the operating system software, for example channel 0. Typically, an installer will program this value in the DET memory as part of the initial installation procedure, using the keypad on the DET or the remote controller (not shown).

A party providing the operating system upgrade service operates a data carousel application. With this type of application, a digital data stream cyclically repeats, and in accord with the present invention, the network carries the repeating data stream on a broadcast channel. The data stream may include video, audio, data and executable code. For an operating system download, the repeating data consists of a data file containing new operating system code.

The party selling the set-tops to the video information users (VIUs) will provide the operating system updates for those set-top terminal devices. For example, if one of the VIPs sells set-top devices, then that VIP would offer the operating system update service for those set-top devices. If the video dial tone network operator sells the set-top devices, then that operator would offer operating system updates. If the network operator does not operate its own encoder system 11 for other purposes, the operator can make arrangements with one of the VIPs to supply the operating system data carousel through that VIP's encoder system.

To provide the broadcast downloading, a VIP operates a software server, such as server 12. Typically, the server 12 is a personal computer or the like which compiles the code and/or data for transmission. For applications, such as for controlling navigation through the VIP's program services, the computer compiles application software and data to be processed by that application software. For the operating system upgrade service, the computer compiles a data file containing the instructions which form the various modules of the operating system. The computer cyclically outputs the relevant data in sequence. For the operating system download, the computer repeatedly sequentially outputs the contents of the data file.

The server outputs the data file to the encoder system 14. The encoder system processes the data and supplies the processed data to the network 15 for broadcast along with the encoded program information offered by the VIP from the source system 11. When necessary, the set-top selects the appropriate channel, e.g. channel 0, decodes the data from the broadcast through the network and recaptures the operating system data file. In the preferred embodiment, the NIM 101 performs the channel selection and conversion back to a data transport stream (e.g. MPEG packets) from the physical layer protocol utilized on the network (e.g. ATM). The DET 102 in turn processes the transport stream to capture the data file. The DET 102 then utilizes the data file to upgrade its stored operating system software.

In the preferred implementation, the channel 0 that carries the operating system upgrade files also carries network program guide information. The network offers 6 Mbits/s channels. In one example, channel 0 will carry the operating system data file at 1.5 Mbits and carry the video and audio packetized elementary streams for the program guide service at a combined rate of 4.5 Mbits/s in a time division multiplexed transport stream at a combined rate of 6 Mbits/s.

The DET operating system upgrade of the present invention can be initiated either automatically or manually. The DET 102 may automatically check the time or number of power-off cycles since the last upgrade, to trigger an operating system upgrade routine. Alternatively, the user may execute a specified sequence of keystrokes on the remote control to call up a menu. One option on the menu is operating system upgrade. Manual selection of the operating system upgrade feature from the menu would trigger execution of the software upgrade routine.

Once initiated, the only difference in the two procedures is whether the DET 102 provides on screen displays during the upgrade procedure. During a manually initiated procedure, the DET 102 will output some form of 'Please Wait' message for display on the screen of the associated television set 103. During an upgrade procedure automatically initiated, e.g. after a power-off input by the user, the DET will not generate any messages.

When initiated, the DET 102 executes a normal channel selection appropriate to the particular network to receive the channel carrying the software broadcasts. In the present example, the DET 102 instructs the NIM 101 to select channel 0, and the NIM alone or through interaction with network elements selects that broadcast channel, captures the transport stream therefrom and passes that stream to the digital signal processing circuitry within the DET 102.

One of the non-writable sections of the memory within the DET stores an operating system upgrade routine. This routine may be stored in ROM or in a sector (e.g. sector 0) of a flash memory. Once the DET has selected and is receiving channel 0, the DET microprocessor calls and executes the upgrade routine from memory. The upgrade routine includes information and instructions necessary to extract the operating system information from the MPEG data stream.

The microprocessor of the DET 102 will check the operating system version number carried on the network for the particular type set-top terminal, by comparing data contained in one of the packets from the received transport stream to data stored in memory. If the version number for the operating system broadcast on the network is the same as the version number of the operating system currently running in the DET 102, then the DET terminates the upgrade process.

However, if the version number for the operating system broadcast on the network differs from the version number of the operating system currently running in the DET 102, then the DET proceeds with the upgrade process. Specifically, the DET extracts the broadcast operating system from the transport stream from the selected channel and stores that new version in RAM. When extraction is complete, the microprocessor checks and confirms that the extracted and stored version is error free. If no errors are found, the microprocessor transfers the version of the operating system from RAM to non-volatile memory, effectively writing the new version over the old version in the non-volatile memory. The microprocessor checks for errors in the version now loaded to non-volatile memory, and if error free, the microprocessor reboots to begin running under the new operating system.

Figure 2:
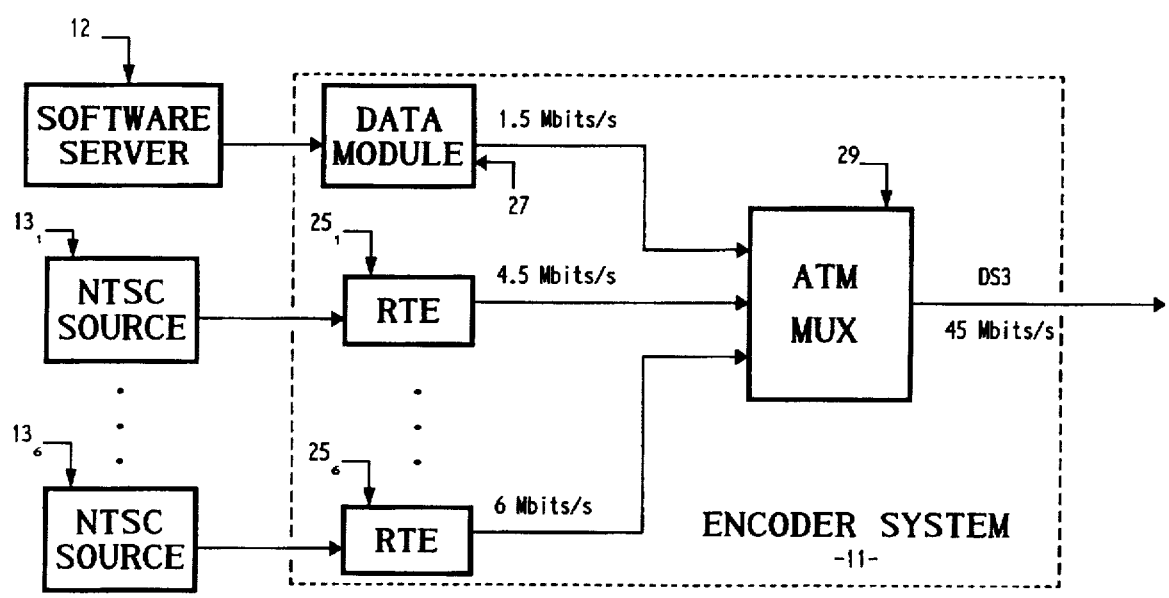
FIG. 2 shows a software server, program sources and an encoder system used in the network of FIG. 1.

FIG. 2 shows the elements of the source system 11 in more detail. As shown, the source system includes six sources ($13_1$ to $13_6$) of baseband audio/video information, e.g. in NTSC signal format. The encoder system 14 includes a corresponding number of real time encoders (RTEs) $25_1$ to $25_6$. Each RTE converts one baseband program signal into digitized and compressed form in accord with the selected protocol. The RTEs supply encoded information to an ATM multiplexer 29, either directly as shown for live or other real-time type broadcast services or through some form of storage device or server (not shown) for other types of broadcast and IMTV services.

The encoder system also includes a data module 27. The data module 27 receives the cyclic data output from the software server 12 via an appropriate data interface, e.g. via an Ethernet. The data module 27 formats the data in the same type of packets as produced by the real time encoders $25_1$ to $25_6$. Preferably, the data module 27 also constructs and inserts certain packets carrying information that the set-tops 100 need in order to find and decode copies of operating systems carried in the packet stream. Because the output from the software server 12 cyclically repeats, the resulting sequence of packets output from the data module 27 also repeats. In an alternate embodiment, the server and data module could be combined, so that the operating system software is stored in memory in MPEG packet form and cyclically, repeatedly output. The data module 27 supplies the packets to another input of the ATM mux 29. The ATM mux adapts the packets from module 27 into ATM cells in the same manner as for packets from the real time encoders $25_1$ to $25_6$ and multiplexes the resultant cells into the output stream together with the cells carrying the encoded program information.

In the preferred embodiments, the program material represents a television type program or the like in NTSC format. The video information, accompanying audio information and certain related data are encoded using a standardized digitization and compression technique, such as DIGICIPHER™ or preferably MPEG (moving pictures expert group). Typically, these digital compression protocols also specify a standard packet data format.

In the preferred implementation, the RTEs $25_1$ to $25_6$ and the data module 27 operate in accord with MPEG II. A detailed discussion of the standard may be found in International Organisation for Standardization Organisation Interationale de Normalisation, "Coding of Moving Pictures and Associated Audio", ISO/IEC JTC/SC29/WG11, CD ISO/IEC 1-13818, February 1994, and a brief summary of MPEG II processing follows.

MPEG is a bi-directional predictive coding compression system, utilizing discrete cosine transformation (DCT) processing to digitize and compress video information. For video information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference (I) frame, this specific number also is set in the MPEG syntax. Information from previous video frames as well as later video frames is used in formulating the prediction. "Delta" or "B frame" information is developed for coding the video frames between the actual and predicted frames, also by looking at frames in both directions. Rather than updating a whole frame, only the changed (or delta) information is provided for the delta video frames. Typically, between I frames, the frame sequence consists of a repetitive succession of two B frames followed by one P frame.

MPEG II also specifies digitizing and compressing techniques for accompanying audio information. The MPEG II standard provides a standardized format for packetizing the compressed audio and video information and for other data. Under the MPEG II standard, incoming individual video signals and related audio signals are encoded and packetized into respective Video and Audio Packetized Elementary Streams (PES). The video and audio PES's from one or more sources of video programming may be combined with similarly packetized data into a transport stream for transmission or storage.

Each frame of compressed audio or video program information is broken down into a series of transport packets. Data, e.g. in Ethernet protocol form, is also repacketized into MPEG II transport packets. Although the frames can vary in length, e.g. between a full reference I-frame and a delta B-frame, the transport packets have a fixed 188 byte size. Thus, different frames are broken down into different numbers of MPEG transport packets. For example, in a 6 Mbits/s encoding system, a group of frames consisting of a total of 15 frames for one-half second of video (one I frame and a number of P and B frames), breaks down into approximately 4000 transport packets.

The MPEG II standard also permits transport of private or user data as payload information in the 188 byte packets. As discussed in more detail below, each packet includes a packet identifier (PID) value, and the encoder or data module inserts the assigned PID into the packet as part of the packet formatting process. Different PID values are assigned to different programs and content. For example, one program may have a first PID for video, a second PID for audio and a third PID for related data (e.g. closed captioning). The same stream may also contain private data not directly related to the program, e.g. application or operating system software, and a different PID is assigned to packets transporting that data.

Figure 3:
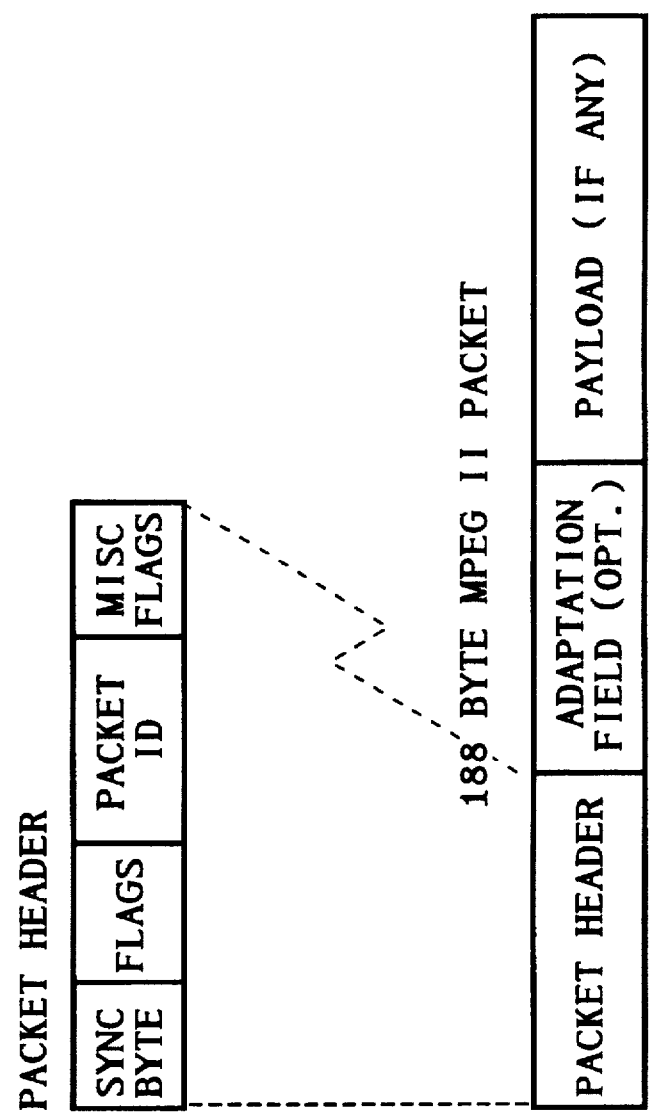
FIG. 3 illustrates an exemplary structure of an MPEG II type data packet.

As shown in FIG. 3, each 188 byte transport stream packet consists of two or three sections, a 4 byte packet header section, a payload section and/or an optional adaptation field. The header information includes, inter alia, a synchronization byte, a variety of different flags used in reconstruction of the frames, and a thirteen bit program identification (PID) number. PID value 0 is reserved as an indication that the packet includes program association table data (mapping program numbers (PNs) for individual programs into PID values for program maps for those programs). PID value 1 is reserved for identification of packets containing conditional access data, such as encryption information. Other program identification numbers are utilized to identify transport packets with the program source from which they originate.

Periodically, the transport packet for each audio/video program will also include a program reference clock (PRC) value within the optional adaptation field. In a typical 6 Mbits/s MPEG II encoding system, the PRC is present in approximately 10 out of every 4000 video transport packets.

When included, the optional adaptation field includes a section for miscellaneous flags, such as discontinuity counter, private data flag, etc. One of the possible flags carried in this portion of the adaptation field is a program clock reference (PCR) flag. The adaptation field (AF) also includes a section designated for AF options. One of the options this section may carry is the PCR value.

On decompression, the decoder in the DET 102 in sequence reconstructs the frames for a particular program from packets bearing the appropriate PID values, uses the reference frame to form the prediction frames, and then uses the prediction frames and delta information to construct full frames from the delta frames. As discussed in more detail below, circuitry within the DET 102 routes the private data, such as the software download data, to the microprocessor of the DET for further processing.

Returning to FIG. 2, the data module 27 receives a data stream, e.g. RS-232 or Ethernet, from the software server 12 and converts the data stream to an MPEG II transport stream consisting of packets of the type shown in FIG. 3. Essentially, the data module 27 subdivides the input data into units which will fit in the payload of MPEG II packets and combines those units with appropriate MPEG II headers to form the MPEG II packets. The information in the added headers identifies the packets containing the software and identifies the payload information as private data.

The data module 27 also inserts one or more appropriate PID values into the packet headers. For example, one PID value would identify the operating system for a first model of DET, another PID value would identify the operating system for a second model of DET, etc. Separate PID values would identify any application software to be broadcast on the same channel.

The data module 27 also constructs a number of packets used to find and decode desired sequences of packets in the stream, for example a program association map (PID 0), one or more program map tables and a network table. The information contained in the map and tables are discussed in more detail below.

The preferred network embodiments utilize ATM transport, therefore the encoder system 14 includes an ATM multiplexer (mux) 29. The data module 27 receives a repeating or cyclical sequence of one or more data files from the server 12 and supplies a repeating sequence of MPEG II packets to the ATM multiplexer 29.

In ATM, transfer is asynchronous in the sense that the recurrence of cells that contain information from any particular sender is not necessarily periodic. Each device using an ATM network submits a cell for transfer when they have a cell to send, not when they have an assigned or available transmission time slot. However, the ATM cells may ride in synchronous slots on a high-speed time division multiplexed media, such as a SONET optical fiber. ATM allows any arbitrary information transfer rate up to the maximum supported by the ATM network, simply by transmitting cells more often as more bandwidth is needed.

In ATM, information is organized into cells having a fixed length and format. Each cell includes a header, primarily for identifying cells relating to the same virtual connection, and an information field or "payload". Under presently existing ATM standards, a 53 byte ATM cell includes a cell header consisting of 5 bytes and a payload consisting of 48 bytes of payload data (see FIG. 4). The ATM cell header information includes a virtual path identifier (VPI) and a virtual circuit identifier (VCI) to identify the particular communication to which each cell relates. The specific format of the ATM cell is described, for example, in the ATM User Network Interface Specification, Version 3.0, published by The ATM Forum, Mountain View, Calif., also published by Prentice Hall, the disclosure of which is incorporated in its entirety by reference.

Figure 4:
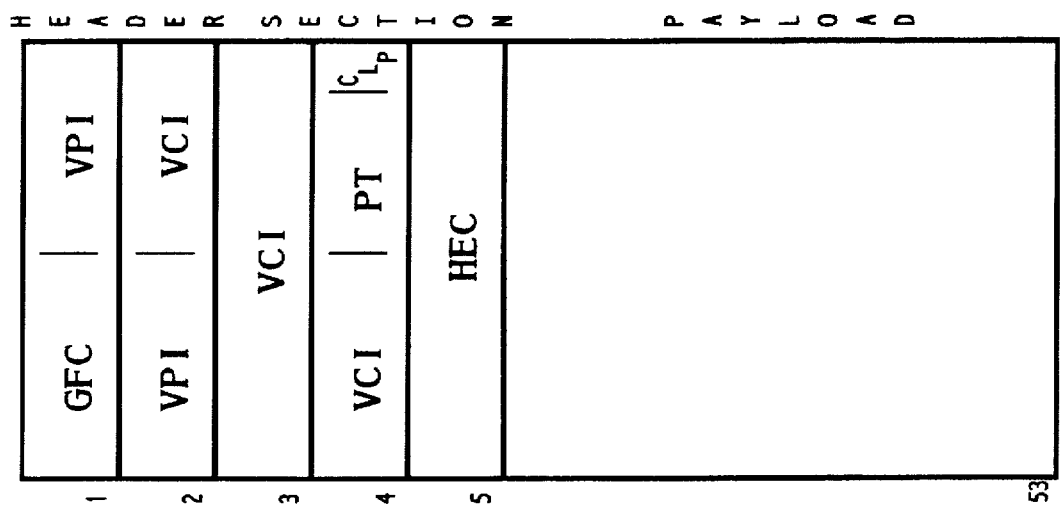
FIG. 4 shows an exemplary structure of an ATM cell.

FIG. 4 depicts a typical ATM cell format. The ATM cell includes a header section and a payload section. The first 8-bit byte of the header section includes a 4-bit GFC word which provides access control. The first byte of the header section also includes the lower four bits of an 8-bit virtual-path identifier (VPI). The second byte of the header section includes the upper four bits of the VPI and the first four bits of a 16-bit virtual circuit identifier (VCI). The third byte includes the next eight bits of the VCI. The fourth byte of the header section includes the last four bits of the VCI; a 3-bit payload type indicator (PT); and a cell loss priority bit (CLP). The fifth byte of the header section includes an 8-bit header error check (HEC) word. Bytes 6 to 53 carry information and form the ATM cell payload section.

As used here, the ATM multiplexer 29 performs an ATM adaptation function which converts the input information (in MPEG II transport packets) into ATM cells. The ATM multiplexer 29 also performs a multiplexing function to combine cells streams carrying payload data from a number of sources into one higher rate bit stream.

In ATM based networks of the type under consideration here, the MPEG II bit streams are converted into cellular payload data, and cell headers are added. A number of techniques can be used to adapt the transport packets into ATM cells, and certain preferred techniques are described below by way of example.

Figure 5A:
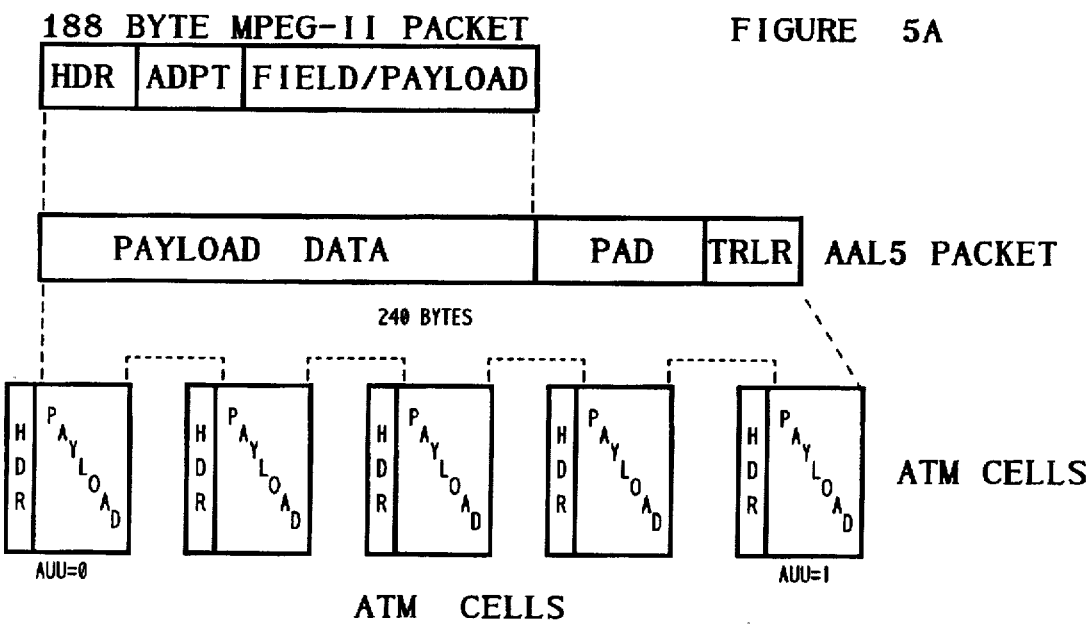
FIG. 5A illustrates a five-cell adaptation for mapping an MPEG II packet into ATM cells.
Figure 5B:
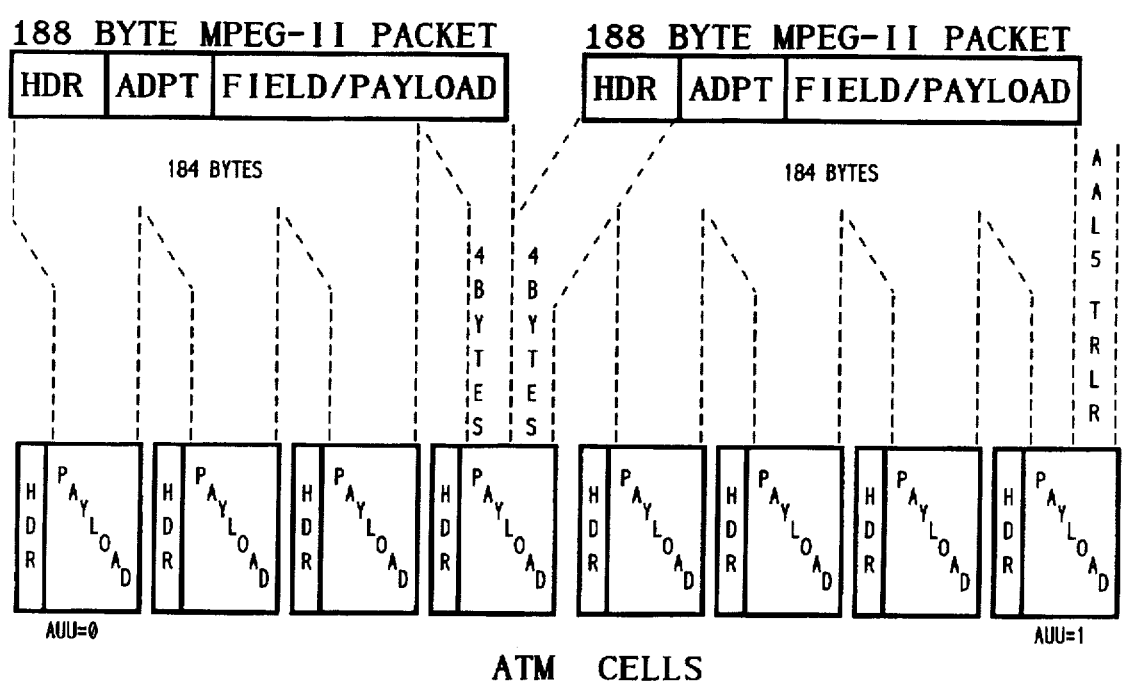
FIG. 5B illustrates an eight-cell adaptation for mapping two MPEG II packets into ATM cells.

As noted above, each MPEG packet consists of 188 bytes, whereas each ATM cell includes 48 bytes of payload data. The ATM multiplexer which map the MPEG packets into ATM cells preferably uses two different adaptations to encapsulate MPEG II packets in ATM cells. The first adaptation maps one 188 byte MPEG packet into five ATM 48 byte cell payloads (FIG. 5A). The second adaptation maps two 188 byte MPEG packets into eight ATE 48 byte cells payloads (FIG. 5B).

MPEG packets of 188 bytes map efficiently into ATM cells if pairs of packets are mapped into 8 cells. However, a delay is imposed on mapping of a first cell while waiting for the second cell in the pair. To minimize jitter at the decoder, the packets carrying the PCR values need to be encoded and transported quickly. To avoid delaying first packets containing a PCR while processing a second packet, the present system maps first packets containing a PCR immediately, using the five cell adaptation procedure. In a typical video transmission, the PCR is present in approximately 10 out of every 4000 MPEG II packets. Also, at least some of those 10 packets will arrive as the second packet of a pair. Consequently, only a very small number of packets are mapped using the less efficient 5-cell adaptation.

As shown in the simplified block diagram of FIG. 2, each MPEG type real time encoder RTE 25 supplies a stream of MPEG II packets to the ATM multiplexer 29. The ATM multiplexer 29 checks the flags in the adaption field (if any) in the first packet to determine if that packet includes a program clock reference (PCR) value. The ATM multiplexer applies the 5 cell adaptation to first packets containing a program clock reference (PCR) value. The ATM multiplexer applies the 8 cell adaptation to pairs of cells wherein the first packet does not contain a program clock reference (PCR) value. Packets containing private data, such as applications and operating system software, will not contain a PRC flag.

For each type of adaptation, the ATM multiplexer 53 will first convert the source packet or pair of packets into a single ATM adaptation layer 5 (AAL5) packet. As part of this conversion, the mux will add an AAL5 trailer, either at the end of the single packet or at the end of the pair of packets. The actual trailer consists of 8 bytes of data, including 4 bytes of cyclic redundancy check (CRC) data, user information (e.g. length), etc.

For a 5 cell adaptation (FIG. 5A), the AAL5 packet consists of a single MPEG packet of 188 bytes and an 8 byte AAL5 trailer, for a total of 196 bytes. To map this packet into ATM cells, the AAL5 packet is also padded with 44 bytes after the trailer, for a total of 240 bytes of payload data. The ATM mux 53 breaks the AAL5 packet (240 bytes) down into five 48-byte payloads (SAR-PDU) and attaches appropriate 5 byte headers to each payload to thereby form five 53-byte ATM cells.

The header of all five of the ATM cells will contain the VPI/VCI value assigned to the particular communication. For example, for the broadcast service combined with the software downloading, the assigned VPI and VCI value would correspond to network logical channel 0. For the video and audio portion of the program guide service, the packets would periodically contain a PCR value and periodically would go through the 5 cell adaptation in the normal manner. The header of the first of the five cells also has a bit designated "AAU" which has a value of "0" to identify that cell as the first cell. The header of the fifth cell will have an AAU bit value of "1" to identify that cell as the last cell.

For an 8 cell adaptation, the AAL5 packet consists of two MPEG packets of 188 bytes and an 8 byte AAL5 trailer, for a total of 384 bytes. The ATM mux 53 breaks the AAL5 packet (384 bytes) down into eight 48-byte payloads and attaches appropriate 5 byte headers to each payload to thereby form eight 53-byte ATM cells. The AAL5 layer is omitted from FIG. 5B for simplicity. That drawing shows the mapping of two MPEG packets into eight ATM cells with the inclusion of the AAL5 trailer in the last cell.

The header of all eight of the ATM cells will contain the VPI/VCI value assigned to the particular communication. Continuing the above example, if the MPEG data relates to the program guide or the operating system downloading service, the assigned VPI and VCI values would identify logical network channel 0 as in the above discussed example of the five-cell adaptation. The header of the first of the eight cells will have an AAU bit value of "0" to identify that cell as the first cell. The header of the eighth cell will have an AAU bit value of "1" to identify that cell as the last cell.

As noted above, each cell of a particular stream will have a header which contains a virtual path identifier/virtual circuit identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, in the above broadcast example, the cells from the one broadcast program all contain the same VPI/VCI value whether the five-cell adaptation was used or the eight-cell adaptation was used.

In the presently preferred embodiment, the ATM mux 29 processes MPEG II packet streams for a combined program or transport stream capacity of approximately 36 Mbits/s. For simplicity, it is assumed that normal video programs utilize a 6 Mbits/s encoding. The program guide service, however, includes relatively little motion and can be efficiently encoded at a 4.5 Mbits/s rate. The data module therefore can cyclically output the software at 1.5 Mbits/s. The ATM mux 29 therefore receives packet streams from up to six real time encoders (RTEs) 25 and one data module. In a source system 11 offering no software downloading service there would be no server 12 or data module 27, and the mux 29 would receive six 6 Mbits/s MPEG II streams from the six RTEs. The ATM mux 29 performs the AAL5 adaptations of FIGS. 5A and 5B on all of the inputs from the real time encoders $25_1$ to $25_6$ and the data module 27 (if included). The ATM mux 29 forms the actual ATM cells with assigned VPI/VCI values in the cell headers and combines the ATM cells from all of the programs and the software transmission into a single DS3 bit stream.

In mapping cells from multiple programs to ATM cells and combining cell streams into a signal bit stream, it is necessary for the mux 29 to map the PID value from each MPEG II packet into the correct VPI/VCI value for the corresponding program. The ATM mux 29 therefore is programmed to recognize the PID values of packets for each program and apply the adaptation techniques discussed above relative to FIGS. 5A and 5B and to map the PID values into the assigned VPI/VCI values.

At the network node which terminates the ATM cell transport, a receiver captures each ATM cell having a specified VPI/VCI. In the preferred embodiment, the network 15 transports ATM cells through to the set-top terminals 100, therefore the receiving node would be the subscriber's terminal or set-top 100.

The element of the network terminating ATM transport will include an ATM demultiplexer (not shown). In the preferred embodiment utilizing ATM cell transport to the set-top terminal devices 100, the ATM demultiplexer is an element of the NIM 101. In other network implementations, the ATM demultiplexer may simply reconstruct the MPEG transport streams and supply those streams to some other mechanism for broadcasting the MPEG streams to the set-top devices 100.

Wherever implemented, the ATM demultiplexer receives a multiplexed ATM cell stream carrying ATM cells relating to a number of programs or sessions. The ATM demultiplexer performs two functions, demultiplexing the combined stream to recover cells relating to at least one communication and ATM to MPEG reverse adaptation to strip off the ATM cell headers and reconstruct the MPEG packets. In the preferred embodiment wherein the ATM demultiplexer is an element of the NIM 101, as part of the demultiplexing function, the demultiplexer captures all MPEG II packets carried in cells having a single specified VPI/VCI value and provides those packets to a decoder in the DET 102.

Other demultiplexing functions are possible depending on where the demultiplexer fits into the overall network architecture. For example, the demultiplexer could provide multiple outputs to multiple decoders. For example, the hybrid fiber coax based system disclosed in FIG. 4 of the above-cited 08/304,174 application, an ATM packet handler performs the ATM demultiplexer function. That packet handler provides multiple output rails each of which carries a combined MPEG II packet stream for 4 programs for broadcast in one 6 MHz RF channel. The NIM captures a combined stream from an RF channel, and an MPEG decoder in the DET processes packets for one of the 4 programs based on PID value recognition.

As part of the reverse adaptation functionality, the demultiplexer buffers cells until it finds a cell having an AAU value of "0" in its header (first cell) and another cell having an AAU value of "1" in its header (last cell). The demultiplexer counts the number of cells from first to last to determine the type of adaptation used to map cells.

If the demultiplexer has captured five cells, the demultiplexer pulls out the payload data and uses the CRC data do check for errors. If there are no errors, the original MPEG packet is reconstructed from the appropriate bytes of payload data from the first four cells. Similarly, if the demultiplexer has captured eight cells, the demultiplexer pulls out the payload data, does the CRC based error check, and if there are no errors, the original pair of MPEG packets is reconstructed from the appropriate bytes of payload data from the eight cells.

The DET 102 processes the MPEG II packets in the resultant stream based on their respective PID values. Packets having PID values assigned to audio or video are processed by corresponding decoders and associated driver circuits to produce signals for driving the television set 103 to display the program information to the user. Downloaded software, however, is transferred as private data to the microprocessor of the DET. Of particular note for purposes of the present invention, if the software relates to an operating system, the microprocessor executes the upgrade routine to replace the existing operating system stored in non-volatile RAM with the newly received operating system software.

To facilitate an understanding of the operating system download feature it is useful to consider the structure of the set-top terminal 100 in more detail. A preferred network implementation is discussed below with regard to FIGS. 8A and 8B, and a preferred procedure for operating system upgrades executed by the DET 102 is discussed below with regard to the flow chart of FIG. 9.

Figure 6:
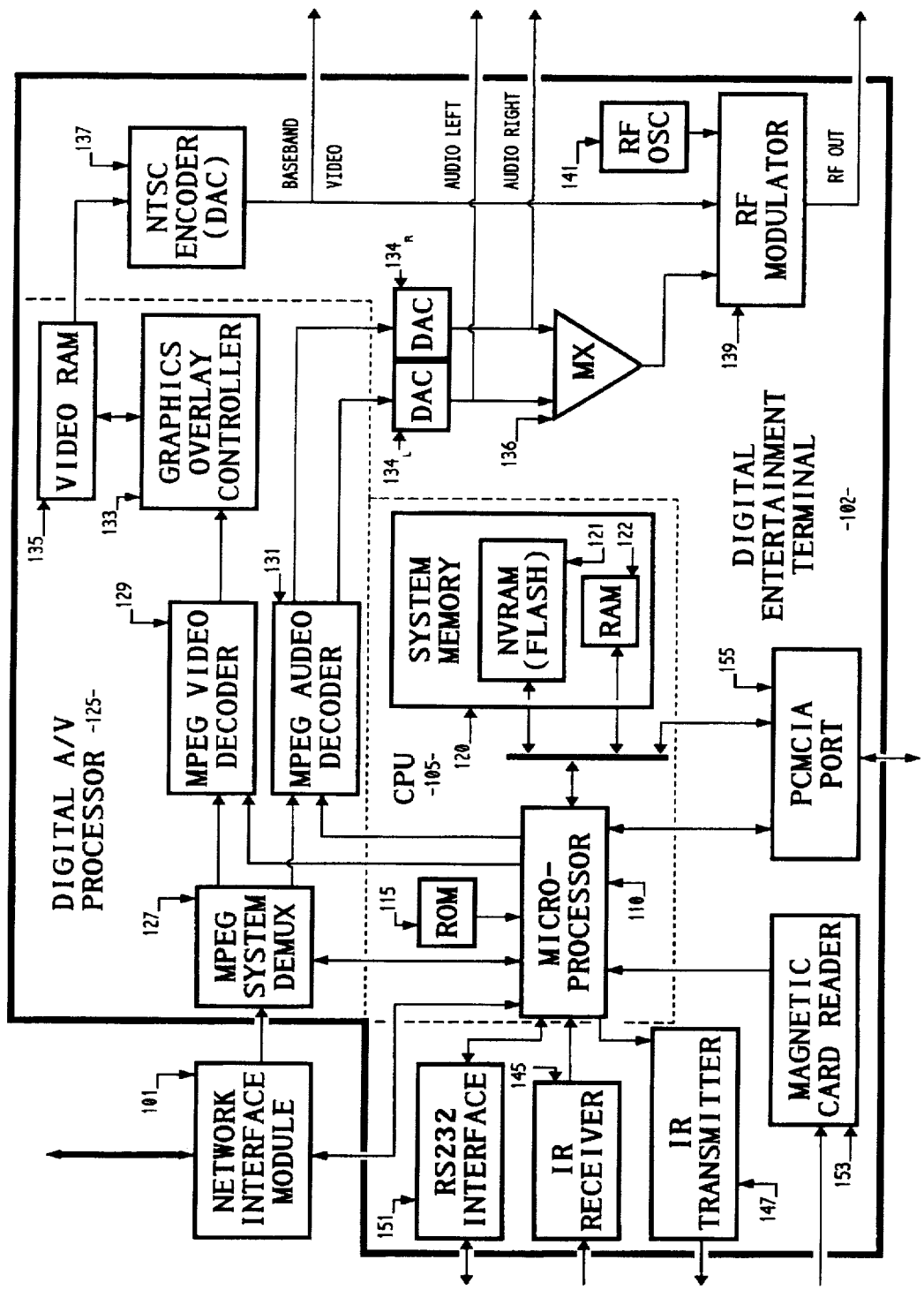
FIG. 6 illustrates a digital set-top terminal device in accord with the present invention.

The set-top terminal 100 shown in FIG. 6 will connect to a number of different types of digital networks, offering broadcast and point-to-point type services, such as disclosed in commonly assigned application serial no. 08/413,810 filed Mar. 28, 1995 entitled "Access Subnetwork Controller for Video Dial Tone Networks" (attorney docket no. 680-093B), the disclosure of which is incorporated herein entirely by reference. A specific preferred network embodiment is discussed in detail below with regard to FIGS. 8A and 8B.

For each different type of network, the terminal 100 includes a network interface module 101 providing the actual physical connection to the particular type of network. For example, in a fiber to the home network, the module 101 would include means for two-way conversion between electrical and optical signals and connections to one or more optical fibers for the necessary two-way transmission. However, the network interface module might be modified for a non-physical communication link, for example, via satellite-to-antenna, especially in rural areas. In the preferred network discussed below, the NIM 101 provides the connection to the coaxial cable type drop.

The network interface module 101 will also perform any format conversion necessary between signal formats utilized by the network and signal formats used within the DET 100. For example, in the switched digital video type network disclosed below with regard to FIGS. 8A and 8B, the network interface module 101 will include means to receive and process a baseband 180 Mbits/s broadband data stream, select a DS-3 from that stream, and process and convert a selected ATM cell stream into MPEG II bit stream for further processing by the DET 102.

The network interface module also provides two-way signal conversion and formatting for control signalling between the DET and NIM and for a control signaling channel through the particular network. For example, the network interface module would include means to multiplex and demultiplex signals for transmission/reception over a coaxial cable or optical fiber.

In the illustrated embodiment, the network interface module 101 presents two connections to the DET 102, a high bit rate broadband connection and a low bit rate signaling connection. The broadband connection is a one-way downstream only connection, but the low-bit rate signaling connection is a two-way connection.

The network interface module 101 takes the form of a plug in module. In one embodiment, the module 101 would be similar to a daughter board or option card which can be plugged into a back plane of a personal computer (PC). In such an embodiment, typically a technician could replace the module in either the field or the shop, to modify a set-top device 100 to connect to and communicate over a different network, and the technician would modify associated communications control software in the system memory. Alternative implementations may use a user replaceable cartridge type network interface module, similar to a video game cartridge, which may include memory in the module for storage of the communications control. As a further alternative, the network interface module could include a digital signal processor controlled by the CPU of the DET 102 and input/output connections compatible with all of the digital broadband networks currently available. The downloaded operating system software stored in the system memory of the DET would control operations of the digital signal processor to send and receive signals in accord with the particular network to which the subscriber chooses to connect the set-top device 100.

The DET 102 includes a CPU 105, comprising a 386, 486 PENTIUM™, or Motorola 6800 Series microprocessor 110 and associated system memory 120. The system memory 120 includes at least 2 mbytes of volatile dynamic random access memory (RAM) 122 and 1 mbyte of non-volatile random access memory (NVRAM) 121. In the preferred embodiment, the NVRAM 121 is a flash memory device. The CPU 105 also includes a read only memory (ROM) 115, either as a separate element connected to the microprocessor 110 as shown or as an element within the microprocessor 110. The ROM 115 stores "loader" programming needed to control wake-up. The non-volatile RAM 121 stores the operating system for the microprocessor 110. In operation, the volatile RAM 122 temporarily stores applications programs for execution by the microprocessor 110 as well as related data files, and during operating system download operations, the RAM 122 temporarily stores the new operating system.

In the preferred embodiment, the operating system for the DET 102 includes a version of a PC type operating system, e.g. OS-9. In addition, the operating system for the DET 102 includes the various drivers necessary for the DET microprocessor 110 to operate the associated peripherals, e.g. the Digital Audio/Video Processor 125, the Personal Computer Memory Card Industry Association (PCMCIA) port 155, the RS-232 transceiver 151, etc. The set-top operating system also includes the resident cable television emulation software, i.e. as needed to facilitate reception of broadcast programs through the particular network. This operating system is stored in a portion of the non-volatile RAM 121 having a relatively low level of protection. When a new operating system is installed, as discussed more fully below, the new operating system replaces the entire operating system previously stored in the non-volatile RAM. The level of protection here provided enables rewriting the operating system using a broadcast channel download procedure, however, there is sufficient protection to limit storage to only acceptable software from an authorized provider.

A digital audio/video (A/V) signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames of video RAM 135.

The MPEG system demultiplexer circuitry 127 recognizes packets in the MPEG data stream received over the broadband channel through the network interface module 101 and routes the packets to the appropriate components of the DET 102 based on the PID values of the respective packets. For example, the MPEG system demultiplexer 127 circuitry recognizes audio and video packets in the MPEG II data stream and routes those packets to the decoders 129, 131, respectively. The MPEG system demultiplexer 127 routes private data, such as downloaded software, to the microprocessor 110.

The MPEG video decoder 129 decompresses received video packet signals to produce a digital video signal, and the MPEG audio decoder 131 decompresses received audio packets to produce left and right digitized stereo signals. For at least some functions, the MPEG decoders 129, 131 may be controlled in response to signals from the microprocessor 110. The MPEG video decoder 129 will internally include at least two frames (e.g. 8 mbytes) of RAM (not separately shown) for use as a frame reorder buffer during the MPEG video decoding process, and the MPEG audio decoder 131 also may include some buffer memory.

The video RAM 135 is not a specialized "video RAM" as that term is sometimes used in the television art. The RAM 135 is actually a standard digital data RAM, of appropriate size, which is used in the DET to store digitized frames of video data. The RAM within the MPEG video decoder 129 likewise consists of standard digital data RAM.

The graphics display generator produces displays of text and graphics data, such as a selection menu received over the signaling channel, in response to instructions from the CPU 105. The video RAM 135 sequentially receives each frame of digitized, uncompressed video information, as output from the MPEG video decoder 129. The video RAM 135 also receives digital information and read/write control signals from the graphics overlay controller 133 representing the several planes of text and graphics information and combines that information with the frames of decompressed video to produce composite video frames.

The graphics overlay controller 133 and the video RAM 135 actually cooperate to manipulate five different planes of video information, four of which can be active at any one time, to produce the composite video frame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overly controller 133. In this last situation, the graphics overlay controller would deactivate the backdrop plane.

Under certain circumstances, the video RAM 135 also serves to freeze video frames. For example, when a video transmission ends for some reason, the RAM 135 will contain the video and associated graphics information for the frame last received and displayed. The DET 102 can continue to output this frame as a still video output signal for some period of time.

The DET 102 also includes audio and video digital to analog converters and appropriate drivers to produce output signals compatible with a conventional television set. Specifically, the converter and driver circuitry of the DET 100 includes audio digital to analog converters (DAC's) $134_L$, $134_R$, an audio mixer 136, an NTSC encoder 137, and an RF modulator 139.

The DAC's $134_L$ and $134_R$ receive the uncompressed left and right digitized audio signals output by the MPEG audio decoder 131. In response, the DAC's $134_L$ and $134_R$ produce baseband analog audio signals for output to individual baseband output terminals. The audio mixer 136 also receives the baseband audio signals from the DAC's $134_L$ and $134_R$. The mixer 136 combines the left and right analog audio signals to produce a monaural audio signal as the audio input to RF modulator 139.

The NTSC encoder 137 also performs a digital to analog converter (DAC) function. In response to the digitized video output signals from the video RAM 135, the NTSC encoder 137 produces a baseband analog video signal in standard NTSC format. The baseband NTSC video signal is supplied to an output terminal of the DET 102. The baseband NTSC video signal is also supplied to the RF modulator 139. The RF modulator 139 responds to the mono audio signal, the NTSC video signal and an RF signal from a local RF oscillator 141, to produce a selected standard RF television signal on an available TV channel, typically channel 3 or channel 4.

The type of connection of the DET 102 to the television set depends on the capabilities of the user's television set. If the user has a monitor type television capable of receiving baseband video and stereo audio inputs, the appropriate terminals of the television would connect directly to the video and audio output terminals of the DET 102. If the subscriber does not have such a television monitor, then the RF output of the modulator 139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET 102 also includes means to receive selection signals from a user, and under at least some circumstances, transmit appropriate data signals over a narrowband channel through the particular video network. For example, the DET 102 may send and receive control data through a signaling channel on the subscriber's loop or drop cable. In the preferred embodiment, a switching element of the network routes selected broadcast channels to the set-top 100. The DET 102 provides selection signals to the NIM 101 for upstream transmission over the signaling channel to that switching element to identify a requested channel. In a similar fashion, the set-top terminal may transmit upstream signaling information through the signaling channel for transport through the network to a video information provider offering interactive services.

In the embodiment illustrated in FIG. 6, the DET 102 includes an infrared (IR) receiver 145. The (IR) receiver 145 responds to inputs signals from a user operated IR remote control device (not shown) similar to that used today for controlling televisions and video cassette recorders. In response to the IR signals, the receiver 145 produces corresponding digital data output signals. The microprocessor 110 interprets the digital data signals by the IR receiver 145 as input commands. The precise interpretation of specific command signals can vary based on the downloaded applications programming and/or the operating system software currently stored in the system memory 120. For example, in response to certain input commands, the microprocessor 110 controls cursor position and alphanumeric information displayed as graphics and text on the associated television set. The microprocessor 110 will also respond to an appropriate input command from the user to formulate a message for upstream transmission though the network interface module 101 and the signaling channel of the particular connected network, e.g. to select a broadcast channel.

The set-top terminal device 100 of the present invention is an open interface device in that it interacts with equipment of a large number of service providers (often referred to as "VIPs") to offer users a wide array of video and interactive multi-media services. In the preferred embodiments, the digital entertainment terminal (DET) 102 is a programmable device to which different individual video information providers (VIPs) can download applications software, and at least one VIP or the network operator (the party selling the set-top device to the end user) can download the operating system software.

In the ROM 155 and/or a relatively high-level write protected portion of the NVRAM 121 (e.g. sector 0 of flash memory), the DET will store a loader program similar to the bios of a PC. The NVRAM 121 will also store an operating system. The loader program and operating system in the ROM and the non-volatile RAM will include sufficient programming to control initial communications and define interfaces and drivers, e.g. for graphics to define the base line functionality of the DET for all service applications the DET will run. This stored software also includes the resident application, which in the preferred embodiment is a CATV-like broadcast program reception routine appropriate for the particular network connected to the set-top terminal 100. The ROM or the most write-protected portion of the NVRAM also stores an operating system upgrade routine for controlling the DET process of upgrading the operating system through a broadcast channel download operation.

The DET 102 of the present invention may also include a number of additional interface devices. In the example illustrated in FIG. 6, the DET 102 includes an IR transmitter 147. The transmitter 147 responds to digital data signals from the microprocessor 110 and outputs corresponding IR signals for wireless transmission. The IR transmitter 147 and IR receiver 145 may operate together to provide a two-way wireless data communication link to some remote device.

such as a personal data assistant (PDA) or pocket organizer. Alternatively, the IR transmitter may send signals to a remote display device for use in a service not requiring the TV set. For example, in an audio on demand service, the IR transmitter would send display data to an LCD display located near the user's stereo system.

The illustrated DET also includes an RS-232 transceiver or interface 151 connected to the microprocessor 110. An RS-232 port is a standardized two-way serial data interface typically used for connecting computers to peripheral devices, such as modems. In the present system, the RS-232 interface 151 might provide a serial data connection to an external personal computer (PC), such that the DET permits communications between the PC and the broadband network. Alternatively, this port might connect the DET to a printer, e.g. to print coupons during home shopping/browsing services. A hand-held diagnostic terminal might also connect to this port during servicing of the DET. The communications and protocols offered by the DET through the interface 151 would be controlled by the operating system and applications program software downloaded into the system memory 120.

FIG. 6 also shows the DET 102 including a magnetic card reader 153 connected to the microprocessor 110. This reader 153 could be used to scan credit card information encoded on magnetic strips on commonly available credit cards. In a home shopping and purchasing service, controlled by the downloaded software, the user would scan their own credit card through the magnetic card reader 153 as part of the payment operations. The reader could also have magnetic write capabilities to perform debit card operations.

The illustrated DET 102 further includes a personal computer memory-card interface adapter (PCMCIA) port 155. This is a two-way interface for connection to and communication with a flash memory module, such as is now incorporated into advanced "smart card" devices. In a medical service, a user might communicate with a medical information database through the DET 102 and the broadband network. The user's personal medical history information could be read from the smart card and subsequently updated on the smart card, through the PCMCIA port 155. Another use of this port might involve communication to a connected video game system to download video game software to the video game system and/or play interactive video games. Although specified as a "memory" port and mapped by the CPU as part of its system memory space, the devices connected to this port 155 can have other data processing capabilities, e.g. buffering and modem communication capability. As discussed below, a technician may also use a PCMCIA card to load operating system software into the NVRAM 121, e.g. when there is a fatal flaw in the currently stored software.

In the current implementation, the PCMCIA port 155 will carry 6 Mbits/s of data, but the port can be designed for higher speeds such as 20 Mbytes/s. Another use of this port would be for connection to an Ethernet card or other Local Area Network (LAN) card to permit data communications between the DET 102 and one or more computers. The set-top 100 would provide the computers with communications services through the broadband network, for example to receive high speed downloads of new or updated software for those computers. Although similar functions are possible through the RS-232 transceiver 151, the data rate through the PCMCIA port 155 is much higher.

FIG. 7 shows the segments of memory in the DET 102. The non-volatile portion of the memory consists of the ROM 115 and 1 mbyte of non-volatile RAM 121 as discussed above. Preferably, the non-volatile RAM 121 consists of 1 mbyte of flash memory. The volatile portion of the memory consists of 2 mbytes of DRAM 122.

The use of flash memory in the preferred embodiment facilitates control of the write operations for different programs stored in the sectors of the memory 121 as a form of memory access control. Access to the different programs is limited by different types of flash memory "LOCKs," each of which requires a predetermined bit pattern to unlock the write operation and permit write access to the memory sectors.

The ROM alone or in combination with a write-protected portion of the NVRAM stores a loader program for controlling many of the wake up functions of the CPU 105. In the preferred embodiment, the write-protected portion of the NVRAM is sector 0. To write code to sector 0 requires a bit pattern, corresponding to 'LOCK1' shown in FIG. 7, which is available only to a technician. The other sectors of the flash memory type NVRAM 121 store the operating system. A bit pattern providing authorized access to write code in the other sectors, corresponding to 'LOCK2' shown in FIG. 7, will not enable writing of code to sector 0. As discussed more fully below, the use of these different bit patterns to control the write operation to the sectors of the flash memory effectively limits who may access the various sectors.

The loader program is analogous to a BIOS (basic input/output system) in a PC. The loader program provides initial instructions to the microprocessor 110 to carry out a series of hardware diagnostics during an initial boot routine and to boot up the operating system stored in the NVRAM 121. If faults are detected, the loader routine will cause display of error codes and instructions on the associated television screen. For example, if the loader routine results in detection of a network error, the DET might generate a display instructing the subscriber to call a telephone number assigned to the network operating company together with a four digit code indicating the type of network fault, e.g. lack of a signaling channel or lack of a broadband channel. Alternatively, if faults in the DET 102 are detected, the display would instruct the subscriber to call a telephone number assigned to the DET vendor together with a four digit code indicating the type of DET equipment fault, e.g. operating system memory error.

In the presently preferred embodiment, the ROM 115 or sector 0 of the flash memory type NVRAM 121 also stores an operating system upgrade routine. The upgrade routine includes information and instructions necessary to extract the operating system information from the broadcast MPEG data stream, in accord with the present invention.

As noted, a specified bit pattern is needed to authorize overwriting of certain sectors of a flash memory. The operating system upgrade routine includes the bit pattern needed to authorize overwriting of all sectors except sector 0. The operating system can also be overwritten by a technician, e.g through the PCMCIA port 155, and the software for overwriting the application used by the technician would include the bit pattern necessary to overwrite sector 0.

Occasionally, it may be necessary for a technician to load software into the DET, for example when the DET has failed due to a fault in the operating system software stored in the NVRAM 121. In practice, the technician turns the set-top 100 off and inserts the PCMCIA memory card in PCMCIA port 155. The technician then turns the set-top device 100 back on. In the currently preferred implementation, the PCMCIA card consists of 2 Mbytes of flash memory and contains the operating full system. The software stored in this card also includes the portion of the loader or boot routine and/or the operating system upgrade routine normally stored in sector 0 of the flash memory of the DET 102.

The driver program used for the PCMCIA port 155 is similar to that for a floppy disc drive, and the data files on the PCMCIA card are arranged and formatted in a fashion similar to files on a floppy disc. When the DET 102 powers-up, the microprocessor 105 checks the various peripherals in a manner analogous to a power-up boot routine in a personal computer. Of particular note here, the microprocessor 105 checks and determines that a PCMCIA card is present in port 155. Rather than booting up the operating system in the system memory 120, the microprocessor detects the bit pattern defining sector access to the DET's internal flash memory in the memory of the PCMCIA card and uses that bit pattern to initiate a sector by sector rewrite of the operating system. Specifically, the operating system stored on the PCMCIA card is transferred sector by sector to the flash memory in the DET 102. The microprocessor then initiates a reboot of the operating system from the internal flash memory to run the new operating system.

The bit pattern used to initiate a write operation into sector 0 of the NVRAM 121 will be kept secure and not broadcast through the network. A technician may utilize this code as described above, but information service providers offering broadcast programs or offering interactive services through the network will not be aware of this bit pattern and will not have authorization to modify the files stored in sector 0.

The operating system upgrade routine typically will include the bit pattern corresponding to LOCK2. The party who sold the DET, e.g. the network operator or a video information provider (VIP), will broadcast software and associated control messages to trigger the actual upgrade of the operating system, and the stored upgrade routine will provide the bit pattern needed to actually write the new operating system software to the relevant sectors of the NVRAM 121.

The 2 MbyteRAM 122 serves principally as a scratch pad memory and as storage for applications software. The application software may be downloaded to the DET 102 through the broadcast channel in essentially the same manner as the operating system from the same provider offering the operating system upgrade service, or any other VIP may download application software through another broadcast channel or through a point-to-point link used for interactive multimedia (IMTV) services.

When the set-top 100 is first connected to power the microprocessor 110 runs its self-diagnostics as specified by the loader routine and boots up the operating system stored in the NVRAM 121. The DET 102 does not start executing any of the processes, such as MPEG demultiplexing and decoding, because it is not yet in an 'ON' state. The DET instead runs in a lower power state waiting for an ON command from the user. When the user turns the box 100 'ON', the microprocessor 105 is already up and running and can quickly initiate channel selection and display. When turned 'OFF' after use, the DET returns to the low power standby state, and the HDT 230 will retain last channel viewed data in memory for use as the initial channel selection when the user next turns the DET ON. As part of the return to the low power state, the microprocessor 105 may repeat the self-diagnostics procedure and reboot the operating system.

When the user turns the box 'off', the microprocessor turns off the various output drivers thereby terminating the television display functionality. To the user, the set-top 100 appears off. The microprocessor 105, however, remains powered and as part of its self-diagnostic routine can determine whether or not an operating system upgrade is necessary, as discussed in more detail below. In the preferred network embodiment, when the user turns the box 100 'ON', the microprocessor 110 initiates a channel selection of the last viewed channel through interaction with the HDT 230 and begins displaying the information from that channel.

Figure 8A:
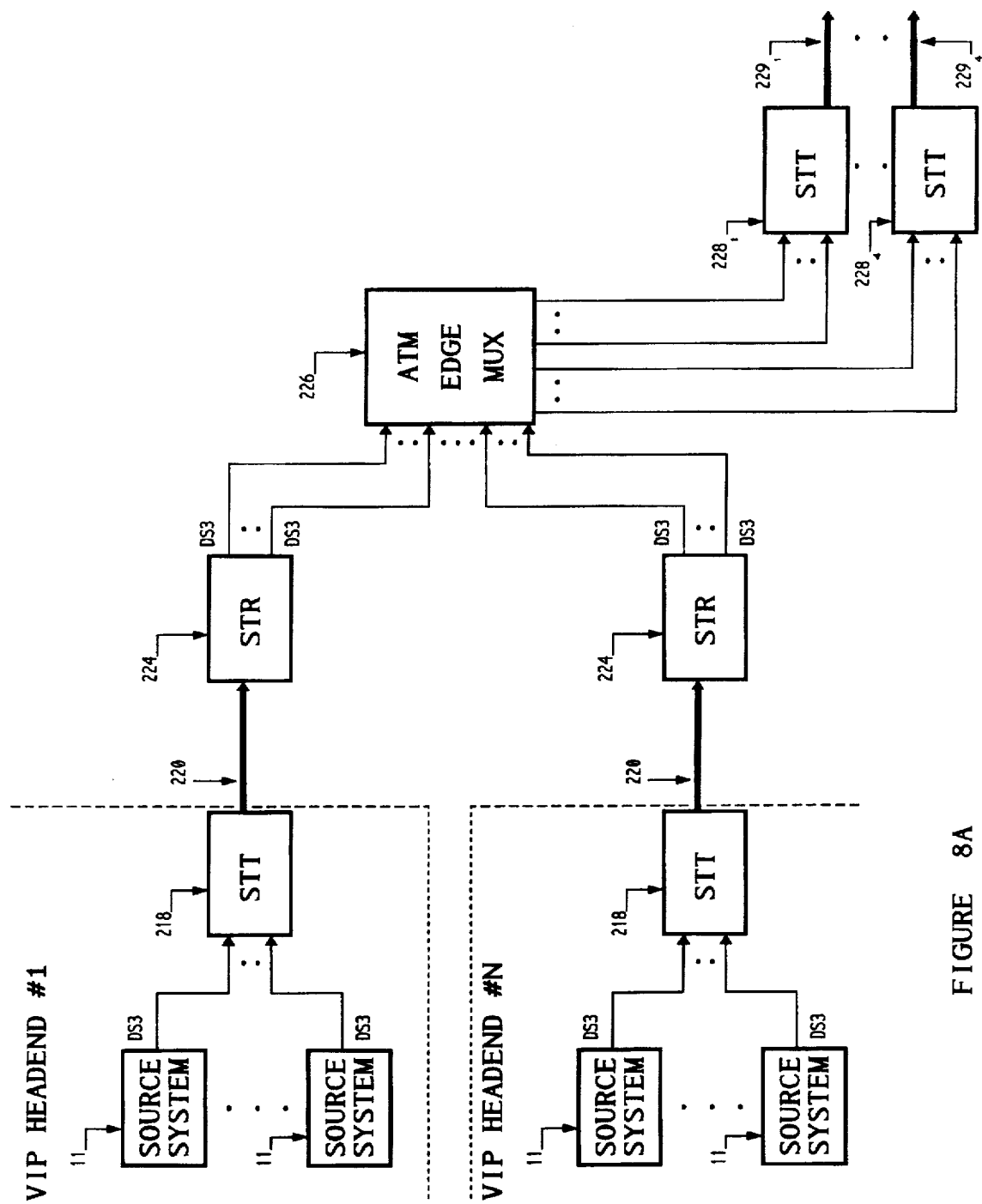
FIGS. 8A and 8B together depict a block diagram of a full service digital broadband network in accord with a preferred embodiment of the present invention.
Figure 8B:
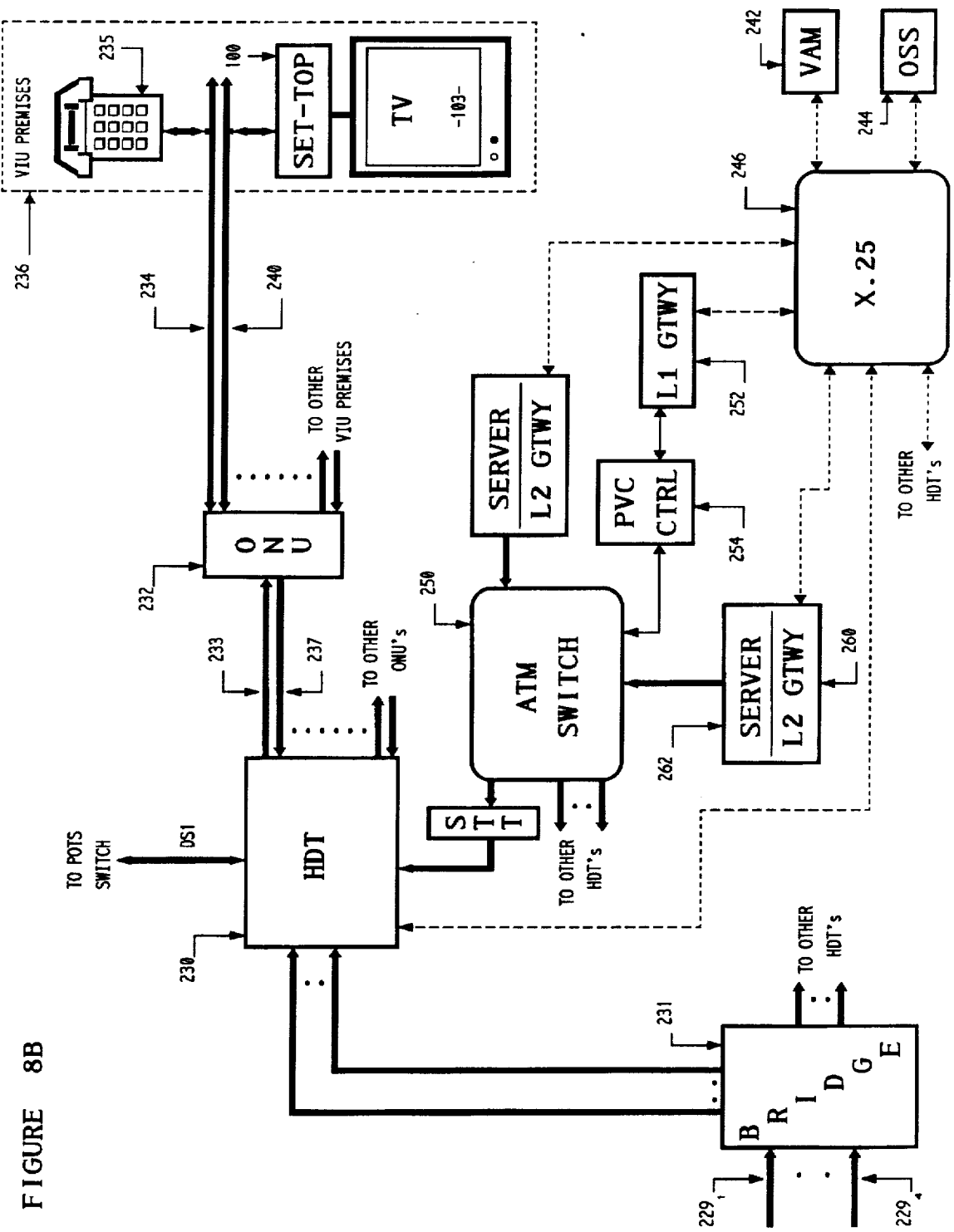

FIGS. 8A and 8B together illustrate a preferred architecture for a full service network providing the terminal operating system downloading service in accord with the present invention. The illustrated network provides transport for broadband services including broadcast video and IMTV type services, such as video on demand. The network also provides interactive text services and voice telephone services.

The illustrated network comprises an ATM backbone network and a local loop network. For broadcast services, the ATM backbone network includes an ATM edge device 226 and optical fibers $220_1$, $220_2$ from the VIP headends to that edge device. The ATM backbone network includes four optical fibers $229_1$ to $229_4$ carrying broadcast programming from the ATM edge device 226 to a large number of host digital terminals (HDT's) 230 (only one of which is shown in FIG. 8B).

For interactive multimedia television (IMTV) services, the ATM backbone network includes at least one ATM switch 250. The ATM switch is controlled by a PVC controller 254. A subscriber wishing to initiate an IMTV session interacts with a level 1 gateway 252 which in turn communicates with the PVC controller 254 to obtain the requisite bandwidth through the switch 250.

The local loop network consists of the HDT's 230, two-way optical fiber pairs between the HDT's 230 and optical network units 232 (ONU's), and coaxial cables 240 and twisted wire pairs 234 connecting the ONU's to the subscriber premises equipment. Control processor elements (not shown) within the HDT's 230 and a video administration module (VAM) 242 control the broadcast services.

Signaling communications between the DET's 239 and the serving HDT 230 utilize a consumer electronics (CE) bus protocol. In the presently preferred embodiment, signaling communications between the other nodes of the network ride on an X.25 packet switched data network 246. In future implementations, instead of data network 246, the ATM switch 250 will carry the signaling traffic together with the IMTV broadband traffic.

For simplicity and ease of understanding, it is assumed here that the network is set up to transport broadcast services from two VIP's headends. In practice there may be more than two broadcast VIPs on the network together offering at least 384 channels of broadcast programming. Each of the broadcast video headends includes one or more of the source systems 11 discussed above relative to FIGS. 1 and 2. Each source system 11 digitally encodes up to six audio/video programs in MPEG II format, and at least one of the sources encapsulates the software data carousel containing the operating system information in MPEG II transport packets. As discussed above, each encoder system includes an ATM multiplexer for adapting the MPEG packets into a single ATM stream at a DS3 rate.

In the illustrated example, the DS3 is actually a one-way asynchronous bit stream. The transmission of ATM cells in an asynchronous DS3 signal requires a common clock reference in order to ensure frame alignment between the ATM multiplexer and a super trunk transmitter 218. The ATM mux therefore presents the MPEG II packet channels in ATM cell format in accordance with a physical layer convergence protocol (PLCP). The PLCP is a framing structure used to ensure that ATM cells are aligned with respect to a corresponding video frame, even though there may exist drifting of a start and end of a typical DS3 frame. Specifically, the PLCP references a DS3 header and identifies the location of each ATM cell with respect to the DS3 header. Since the DS3 frame contains a maximum of twelve ATM cells, the PLCP notes the location of each of the twelve cells with respect to the DS3 header. Therefore, even though there may be DS3 frame drifting, the PLCP ensures alignment, from a cell perspective, between the cell layer and the DS3 frame so that each of the twelve ATM cells within each DS3 frame can be located.

All broadcast service type video information providers (VIPs) supply programming to the network in the form of a DS3 type, MPEG II encoded ATM streams such as that output by the source systems 11. The DS3 bit stream from each system 11 goes to one input of a super trunk transmitter (STT) 218. As discussed below, the STT 218 combines a number of DS3 ATM cell streams into one higher rate bit stream and converts the electrical signals to optical signals for transmission over a trunk fiber 220. One broadcast VIP may have a number of STT's 218, and the network will actually carry optical broadcast streams from multiple broadcast service VIPs.

If the optical transmissions are SONET compliant, the super trunk transmitters 218 and super trunk receivers 224 would operate at an OC rate to transport a standard number of DS3 bit streams. For example, OC-12 equipment will transport 12 DS3 bit streams, OC-18 will transport 18 DS3 bit streams, etc. It would also be possible to use an asynchronous optical protocol.

The preferred embodiment uses super trunk transmitters and receivers manufactured by Broadband Technologies, Inc. of Research Triangle Park, N.C. The preferred super trunk transmitters perform a bit stream interleave type multiplexing. The preferred super trunk transmitters (STT's) 218 are capable of receiving DS3 bit streams from up to sixteen sources, for example up to sixteen source systems 11. Each super trunk transmitter 218 combines those DS3 rate bit streams into a single higher rate bit stream, converts that electrical stream into an optical signal stream and transmits the optical stream over a fiber, such as 220. The optical fibers 220 each transport up to 16 DS3 streams, wherein each DS3 includes six 6 Mbits/s MPEG II encoded transport streams, for a maximum capacity on the fiber of 96 channels per fiber.

According to the preferred embodiment, the network includes a plurality of parallel trunk fibers 220 from different STT's 218 servicing a variety of VIPs. Each fiber 220 goes to a super trunk receiver 224. A different set of input broadcast broadband (e.g. television) signals are encoded and multiplexed in a manner similar to that discussed above to produce the combined DS3 bit stream (up to 96 channels) for transport over each respective optical fiber 220. The network preferably will service up to 50 VIPs.

The trunk fibers 220 are routed to super trunk receivers 224, each of which recovers up to sixteen DS3 bit streams from the corresponding optical signal stream. Each super trunk receiver 224 supplies each recovered DS3 rate stream to one input node of the ATM edge device 226. The preferred ATM edge device 226 receives at least sixty-four DS3 inputs from the STRs 224. The ATM edge device 226 performs policing and grooming on the input ATM cell streams.

The ATM edge device 226 monitors incoming DS3 data streams and determines whether ATM cells within the data streams should be passed to the network or blocked. This functionality of the edge device 226 serves to police incoming cells based on their VPI/VCI values. The edge device will pass cells only if the VPI/VCI values in the cells correspond to a value indicated as valid in the data tables programmed into the edge device. If a cell does not have a valid VPI/VCI value for a currently active program channel, the edge device will not pass that cell to an output port.

Also, the ATM edge device 226 performs policing of DS3 ATM cell streams by monitoring the data rate of incoming data streams from VIPs. For example, if one VIP has subscribed by contract to transmit a particular channel at a data stream rate of 6 Mbits/s, the ATM edge device 226 will prohibit or drop ATM cells having the assigned VPI/VCI value that are transmitted above the subscribed bit rate; in this case, a 6.5 Mbits/s stream would be rejected as an unauthorized rate.

In addition, the ATM edge device 226 provides a grooming function, whereby ATM cells are analyzed, on a cell-by-cell basis, to determine if they should be transmitted on the network. Specifically, each ATM cell having a valid VPI/VCI value is switched through the ATM switch fabric assigned to carry the program identified by the VPI/VCI value. The ATM edge device 226 combines a specified six ATM cell streams into a DS3 bit stream for output on each DS3 output port.

This ATM cell mapping enables DS3 ATM cell streams that are transmitted at less-than-full capacity on the trunk fibers 220 to be mapped onto output DS3 streams operating at full capacity. Although each optical fiber 220 has a capacity of transporting up to 16 fully loaded DS3 ATM streams, at least one optical fiber 220 from two or more VIPs typically will not be operated at capacity, when broadcast VIPs do not offer an even multiple of six channels or when VIPs using the optical fibers have varying bandwidth requirements over time. The ATM edge device 226 processes all incoming DS3 bit streams from all of the optical fibers 220, and maps the ATM cell streams from those inputs into at least one and preferably sixty-four condensed, or combined DS3 output bit streams for further transmission through the network. Thus, the ATM edge device is able to fully load the optical fibers $229_1$ to $229_4$ serviced by the STT's $228_1$ to $228_4$ to fully load the downstream broadcast capacity of the network.

The ATM edge device 226 outputs each groomed DS3 stream to one input of a super trunk transmitter (STT) similar in structure and operation to the STTs 218 discussed above. In a preferred embodiment, each DS3 from the edge device 226 goes to one input of the four STT's $228_1$ to $228_4$. The preferred embodiment can carry up to 384 broadcast program channels over a capacity of 64 DS3 signal paths (four fibers $229_1$ to $229_4$ each carrying sixteen DS3's in a manner similar to the maximum possible on each fiber 220). In that embodiment, the STT's $228_1$ to $228_4$ receive the 64 DS3 ATM streams from the ATM edge device 226, and output the ATM streams over four parallel optical fibers. SONET or other protocols could be used on the fibers $229_1$ to $229_4$ and/or the network could include additional fibers.

The ATM edge device may comprise a relatively small capacity ATM switch. A more detailed description of the ATM edge device and its operation is disclosed in commonly assigned U.S. patent application Ser. No. 08/380,744 filed Jan. 31, 1995 entitled "Full Service Network Using Asynchronous Transfer Mode Multiplexing" (attorney docket no. 680-109), the disclosure of which is incorporated herein in its entirety by reference.

The ATM edge device 226 outputs at least one DS3 stream of combined ATM streams and preferably 16 such streams to each of four super trunk transmitters (STT's) $228_1$ to $228_4$. The ATM edge device 226 will preferably output up to 64 DS3 bit streams to the four STT's $228_1$ to $228_4$. Each particular STT $228_1$ to $228_4$ combines the input DS3 bit streams into an optical stream, in a manner similar to that of STTs 218, for transmission on one of the four fibers $229_1$ to $229_4$.

The signal stream on each optical fiber $229_1$ to $229_4$ is applied to a bridge circuit 231 (FIG. 8B) to supply the optical signal stream through corresponding trunk fibers to a large number of Host Digital Terminals (HDT's) 230 distributed throughout the serving area. The bridge circuitry includes passive bridging elements and may include active bridging elements.

The preferred embodiment utilizes HDTs manufactured by Broadband Technologies, Inc. of Research Triangle Park, N.C. Each HDT 230 handles up to 256 subscribers by switching DS3 bit streams carrying selected program channels onto optical fibers to up to 32 optical network units 232 (ONUs). The ONUs 232 transfer the DS3's over respective coaxial cables to subscriber terminals for display on associated television sets.

The downstream optical fibers 233 from the HDT 230 to each connected ONU preferably transport 24 DS3 ATM cell streams, e.g. using OC-24 SONET compliant equipment. Together, the downstream fiber 233 and upstream fiber 237 also provide transport for 2-way telephone communications and 2-way signaling channels. In an alternate embodiment, the network might use a signal fiber between the HDT and each ONU and provide both downstream traffic and upstream traffic on that one fiber.

In the illustrated embodiment, the downstream optical fiber from the HDT 230 to each ONU 232 may use either an asynchronous optical protocol, or the synchronous (SONET) OC rate transport. The ONU's 232 provide appropriate interfacing between the voice channels on the fibers and twisted wire pair 234 for telephone service into the subscriber premises.

Each video information user (VIU) premises 236 is pre-assigned three DS3 slots on the downstream fiber from the HDT 230 to the ONU 232 for broadband service. Each home or living unit 236 is preferably allocated a capacity of four set-top terminal devices 100, with three being active at any one time. A coaxial drop 240 for each premises 236 carries 180 Mbits/s baseband digital data, which will simultaneously transport three 45 Mbits/s DS3 bit streams. For a particular VIU premises 236, the three DS3 channels on the fiber from the HDT 230 to the ONU 232 and on the drop cable 240 are individually assignable to different set-tops 100 within the subscriber's premises 236. The ONU 232 performs optical to electrical conversion, separates out the DS3's received over the downstream optical fiber 233 from the HDT 230 and supplies the selected DS3 bit stream to appropriate channels on the coaxial cables 240 going to the respective subscriber premises 236.

For narrowband signaling information, the ONU 232 passes all of the downstream signaling data received from the HDT 230 on fiber 233 through to all of the coaxial drop cables 240, so that for signaling data the cables look like a common bus shared by all of the connected set-tops. In the downstream direction, signaling packets are interleaved with the ATM cell stream packets. In the upstream direction, the signaling channel on the coaxial cable 240 is in a different frequency portion of the spectrum from the downstream DS3 transmissions. The ONU combines all of the upstream signaling packets from subscriber drop cables 240 into a digital data stream and transmits that data stream together with digitized upstream telephone service signals over the upstream fiber 237 to the HDT 230.

Each set-top 100 comprises a DET and NIM, as discussed above. In this embodiment, the NIM connects to the coaxial drop cable 240 to send control signals to the ONU 232 and receive video and data signals from the ONU 232. The NIM includes means to selectively demodulate received data from an assigned one of the three DS3 slots on the coax cable 240 and an ATM demux for mapping ATM cells back into the corresponding MPEG packets. As discussed above, the DET includes an MPEG II audio/video (A/V) decoder. Specifically, the ATM demux captures and processes ATM cells bearing specified VPI/VCI header information corresponding to the selected program channel from the DS3 stream. The MPEG II decoder in sequence reconstructs the frames for a particular program from packets bearing the appropriate PID value, decompresses the compressed digital video information, and displays the decompressed digital video information in the appropriate format.

Each set-top 100 includes means to receive selection signals from a user via remote control, and as noted above, the set-top responds by transmitting appropriate data signals over a narrowband signaling channel on the coaxial drop cable to the ONU 240. According to the preferred embodiment, the narrowband signaling channel uses X.25 or a consumer electronics (CE) bus protocol. With the CE bus protocol, for example, the active set-tops 100 are assigned signaling time slots by the HDT 230, and each active set-top 100 transmits channel selection data upstream to the ONU 232 in its assigned slot.

The ONU 232 multiplexes the data signals from the set-tops it services together and transmits those signals to the HDT 230 over an upstream channel on an optical fiber. If the data represents selection signals, the HDT responds to that data as outlined above, and stores data identifying each subscriber's selections for subsequent periodic uploading to a Video Administration Module (VAM) 242. The HDT's 230 connect to the VAM through a first X.25 packet data communication network 246.

The operations of each HDT 230 are controlled by data tables stored within the HDT. The video information providers (VIPs) provision various services for their subscribers by establishing appropriate mapping and profile data in the tables in the HDT's 230. The VIPs, however, do not have direct access to the data tables within the HDTs. Instead, the VIP's access the VAM 242 through a personal computer interface 244 and the X.25 data communication network 246. The VIPs 210 provide provisioning data through the operations and support system (OSS) 244 to the VAM 242, and the VAM 242 periodically downloads that data to the appropriate HDTs 230.

The provisioning data downloaded to the HDTs 230 includes channel mapping information and subscriber authorization control information. The channel mapping information specifies what programs are carried on each ATM virtual circuit, within each DS3, on each respective optical fiber. The HDT 230 accesses the channel mapping information in response to each program selection by a subscriber to route the correct DS3 to the requesting set-top 100 and to inform the set-top 100 as to which virtual circuit within that DS3 carries the requested program. The authorization control data indicates which programs each subscriber is authorized to access, e.g. because that party has subscribed to the particular program service and is not delinquent in bill payments. When a subscriber requests a program, the HDT 230 checks this data to determine whether or not to supply the program to the subscriber's set-top 100.

In operation, the network administration and support personnel enter the VIP profile information including the VPI/VCI assignments in a database (not shown) and manipulate that database to define necessary routing tables for transport of the VIP's broadcast program channels through the network. The database then outputs appropriate information for programming the ATM edge device 226 and information for programming the VAM 242. The VAM 242 periodically updates the actual control tables in each HDT 230 via communications through the X.25 signaling network 246. In particular, the data downloaded to the HDTs 230 indicates the DS3's on each fiber. The data downloaded to the HDTs 230 also indicates the VPI/VCI values for each program channel within each DS3. In the preferred embodiment, the data in the HDT will also include an initial PID value used in capturing and decoding the MPEG II packets for each program channel, e.g. the PID value for the program map packet for the particular program.

In operation, each time a subscriber turns on a set-top 100, the set-top transmits an appropriate signaling message upstream to the HDT 230. The HDT stores a table of valid equipment ID's for the set-tops it services. The signaling message transmitted to the HDT 230 at turn-on includes the equipment ID for the particular set-top 100. When the HDT 230 receives the initial signaling message from the set-top, the HDT executes a routine to initialize the set-top. As part of this initialization routine, the HDT 230 validates the set-top equipment ID and assigns one of the DS3 slots on the downstream fiber 233 to the ONU 232 to that set-top for as long as that set-top remains on. Also, one of the DS3's on the subscriber's coaxial drop cable 240 from the ONU 232 is assigned to the set-top 100 for the duration of communications.

At the same time, the HDT 230 will complete a two-way signaling communication link with the DET in the particular set-top 100. At least on the coaxial cable portion, the packets relating to the signaling link are identified by header information identifying the particular link, i.e. a signaling identifier assigned to this communication between the HDT 230 and the particular set-top 100. As part of the initialization routine, the HDT 230 sends one or more signaling messages to the DET in set-top 100 identifying the signaling channel assignment and the DS3 assignment. Specifically, for the signaling link, the HDT 230 assigns the next idle signaling ID to this call and informs the DET of that signaling ID assignment.

When a subscriber selects a broadcast program, the subscriber's set-top 100 transmits a channel request message, including the equipment ID of that set-top and channel selection information, upstream through the signaling link to the HDT 230. Using portions of the stored data tables, the HDT 230 checks to determine if the particular set-top is permitted to access the requested channel. The access decision may relate to whether or not the VIU has subscribed to the program service requested. Alternatively, the HDT 230 may execute a PIN/password routine discussed later to determine if the person currently operating the set-top is allowed access to the particular broadcast program service.

If the subscriber is permitted access to the requested channel, the HDT 230 switches the DS3 bearing the requested channel from one of the trunk fibers onto the DS3 assigned to the requesting set-top 100 on the fiber 233 going to the ONU 232 serving the particular subscriber. The ONU 232 in turn switches the assigned DS3 on the fiber 233 onto the DS3 assigned to the particular set-top 100 on the drop cable 240 into the VIU's premises 236. The HDT 230 addresses a downstream control message to the set-top using the assigned signaling call ID. The control message identifies the VPI/VCI of the requested program within the DS3 and the MPEG PID value for the MPEG PROGRAM MAP TABLE (PMT), so that the set-top 100 can select and begin decoding MPEG II transport packets for the selected program to produce standard signals for driving a television set 103 or for reception of software.

For example, for an operating system download operation, the VPI/VCI value would identify cells relating to channel 0, and the PID value would identify the program map for the operating system for the particular type of set-top. The NIM 101 (FIG. 6) would select cells having the specified VPI/VCI value and adapt those cells back into MPEG packets as discussed above. The NIM 101 hands off the 6 Mbits/s MPEG transport stream for channel 0 to the MPEG system demux 127. In the preferred embodiment, this stream contains the audio and video information for the program guide service and packets containing data from the operating system file. The DET 102 utilizes the downloaded PID value to capture and process the packet containing the program map table, and uses the data from that table to identify the PID value of packets containing the actual operating system file. The microprocessor 110 uses that PID value to instruct the MPEG demux 127 to capture and forward operating system data packets to the microprocessor 110 for further processing in accord with the operating system upgrade routine.

As noted above, the HDT 230 switches DS3's and instructs the set-top 100 what VPI/VCI values to use to capture cells for particular programs. The set-top 100 processes an assigned one of the three DS3 signals carried on the coaxial cable into the VIU's premises 236; and from that DS3, the set-top 100 captures cells having the VPI/VCI value that the HDT instructed it to capture. When a subscriber wants to switch channels, if the newly selected channel is in the DS3 stream already going to the subscriber's set-top, the HDT 230 provides the set-top with the new VPI/VCI value and PID value for the new channel. The set-top 100 can begin immediately capturing and processing cells bearing the new VPI/VCI and decoding payload data from those cells to present the program to the user via the television set or perform a software download operation, as necessary. If the selected channel is not in the DS3 currently going to the particular set-top 100, then the HDT 230 will switch the DS3 for the new channel from the correct incoming optical fiber onto the DS3 assigned to the set-top on the fiber 233 to the ONU 232. The ONU 232 supplies that new DS3 to the set-top via the currently assigned DS3 slot on the subscriber's coaxial drop cable 234 so that the set-top 100 will begin receiving the new DS3. Through the downstream signaling channel, the HDT 230 also informs the set-top of the new VPI/VCI to permit the set-top to capture and process cells and begin decoding payload data from those cells to present the newly selected program to the user via the television set.

The presently preferred network embodiment also provides transport for interactive broadband services such as video-on-demand and software downloading through point-to-point connections in accord with the disclosure of the 08/250,791 parent application. Typically, the network carries such services offered by two or more IMTV VIPs. As shown in FIG. 8B, an ATM switch 250 provides a bit stream carrying one or more DS3's containing ATM cell streams to each HDT 230, to provide point-to-point connections for such services. As discussed in more detail below, the access through this switch 250 is controlled by the Level 1 Gateway (L1 GTWY) 252.

Each non-broadcast or IMTV service provider preferably has a Level 2 Gateway (L2 GTWY) 260 and some form of file server 262. Typically, the VIP will store volumes of MPEG II encoded material in a variety of memory devices which form the server. An IMTV VIP's equipment preferably outputs ATM cell streams, encoded in the manner discussed above with regard to FIGS. 1 and 2, to the ATM switch 250 for transmission through the network. Alternatively, if the provider's equipment transmits only MPEG II bit stream data, the network operator would supply an interworking unit similar to the ATM multiplexer 29 discussed above to convert the service provider's bit stream data into a DS3 containing one or more ATM cell streams compatible with the Full Service Network. The ATM switch 250 transmits selected ATM cells on the one or more DS3 streams through an STT and an optical fiber going to the HDT 230 serving a particular VIU who requested a session with the particular IMTV VIP. As part of its routing operations, the ATM switch 250 performs policing and grooming functions of the type performed by the ATM edge device 226.

To establish a broadband communication session or connection through the network between an interactive information service provider 210' and a particular set-top 100 requires establishment of a virtual circuit through the ATM switch 250 and the appropriate HDT 230. In the network of FIGS. 8A and 8B, a PVC controller 254 stores data tables defining all possible virtual circuits through the ATM switch 250 to the HDT's 230. These data tables define the header information and the particular fiber output port used to route cells to the correct HDT 230. The data tables thus define "permanent virtual circuits" (PVC's) between the providers and the set-top terminal devices. The PVC controller includes current VPI/VCI data available to each VIP and an ongoing record of which VPI/VCI values are in use. Thus, at any given time the PVC controller 254 knows what VPI/VCI values are available and can be assigned dynamically to provide requested bandwidth for each new IMTV session.

When a subscriber initiates a session with a broadband interactive service provider, the subscriber's set-top 100 provides an appropriate "off-hook" signal to the HDT 230. The HDT 230 sends the message through the X.25 packet switched network 246 to the Level 1 Gateway (L1 GTWY) 252. When the Level 1 Gateway 252 receives the addressed message from the HDT 230, that Gateway uses the billing number ID of the set-top included in the message to check its internal database to determine if the caller is a valid network customer. If the caller is not a valid customer, the system tears downs the session. If the caller is a valid customer, the Level 1 Gateway 252 transmits a call accept message back to the set-top terminal 100 and waits for the first application level message. Once the call is accepted, an X.25 signalling link is provided between the HDT 230 and the Level 1 Gateway 252 for purposes of carrying signaling information between the set-top 100 and that Gateway, and the HDT 230 internally associates that signaling call with the signaling call over the fibers 233, 237 and the coaxial cable 240, i.e. the signaling link set up from the HDT 230 through the ONU 23 to the set-top 100 when the user turned on the set-top terminal.

The set-top 100 next sends an initiation or 'hello' message to the Level 1 Gateway 252 that includes basic information including the set-top ID and a set-top type designation. The Level 1 Gateway 252 interacts with the subscriber through the set-top 100 to obtain a selection identifying one of the IMTV services providers.

The Level 1 Gateway 252 may execute a PIN number access routine, if the subscriber has previously requested such access control for selected ones of the VIPs. For simplicity here, it is assumed that the currently selected VIP is not subject to such a PIN number requirement. The Level 1 Gateway 252 is merely expecting to receive the VIP selection input from the set-top 100, e.g. in response to a menu display, within a predetermined period following the menu transmission. If the Level 1 Gateway 252 receives the selection input message from the set-top 100 within the predetermined period, the Level 1 Gateway 252 translates that message into the 4 digit code for the selected VIP's Level 2 Gateway 260.

Once the selection of the VIP is complete, the Level 1 Gateway 252 then goes over the X.25 network 246 to communicate with the selected VIP's Level 2 Gateway 260 and indicates that it has a customer calling. The Level 1 Gateway 252 identifies the customer to the Level 2 Gateway 260 by sending the 10-digit billing number for the calling set-top 100. The Level 1 Gateway 252 also transmits set-top identification information and set-top type information for the particular set-top 100 to the Level 2 Gateway 260. The VIP's Level 2 Gateway 260 may accept or reject the call after receiving the initial request indicating availability of the identified customer. If accepted, the Level 2 Gateway 260 sends a message back to the Level 1 Gateway 252 indicating acceptance of the call and provides the Level 1 Gateway 252 with a server output port identification for the port on the server 262 which will service the broadband call. The Level 2 Gateway 262 may also indicate that one of a plurality of VPI/VCI values assigned to this VIP should be allocated to this particular session.

In response, the Level 1 Gateway 252 transmits the X.121 address of the calling customer's set-top 100 to the Level 2 Gateway 262. The Level 2 Gateway 262 uses that address to initiate a new signaling communication through the X.25 network to the HDT 230 and the set-top 100. The signaling call to the level 1 gateway 252 is taken down when Level 2 Gateway initiates its signaling call, after which the HDT 230 associates the new X.25 signaling call from the Level 2 Gateway 262 with the established signaling call between the HDT 230 and the calling subscriber's set-top 100 and performs any necessary protocol conversion. For example, the HDT places downstream signaling data from the X.25 call in packets identified with the signaling call ID assigned to the subscriber's set-top 100 at turn-on and transmits those packets through the downstream fiber 233 to the ONU 232 and the coaxial cable 240 to the subscriber's premises 236.

The Level 1 Gateway 252 interacts with the PVC controller 250 to obtain the bandwidth through the ATM switch 250. The Level 1 Gateway 252 advises the PVC controller 254 of the server port identification. The Level 1 Gateway 252 may advise the PVC controller 254 of the VPI/VCI value if such was assigned to the session by the Level 2 Gateway 262. Alternatively, the Level 1 Gateway 252 may obtain a VPI/VCI for the call from internal data or from the PVC controller 254, and then the Level 1 Gateway 252 supplies the assigned VPI/VCI to the Level 2 Gateway 262. The Level 1 Gateway 252 also informs the HDT 230 of a DS3 and VPI/VCI value on the fiber from the ATM switch 250 to the HDT 230 which is assigned to this broadband interactive call. If the ATM switch 250 translates the VPI/VCI values, the HDT 230 may specify the VPI/VCI value assigned to this broadband call on the DS3 on fiber to HDT 230. Alternatively, the level 1 gateway 252 or the PVC controller 254 may administer the VPI/VCI on that fiber and provide this value to the HDT 230.

The HDT 230 switches the identified DS3 from the fiber from the ATM switch 250 to the DS3 assigned to the subscriber's set-top on the fiber 233. The HDT 230 also transmits a signaling message to the set-top 100 indicating the correct VPI/VCI for the cells carrying the downstream broadband transmissions. This procedure establishes a virtual circuit through the network as a logical point-to-point communication link between the selected IMTV VIP's equipment and the calling set-top 100. The HDT 230 may provide the DET with an initial PID value for use in decoding MPEG packets for the session. Preferably, the level 2 gateway and server interact with the set-top 100 through the signaling channel and the ATM virtual circuit to download an application to the memory in the DET 102. As part of this download, the level 2 gateway supplies either a program number of a PID value needed to decode the MPEG stream. After complete downloading of the IMTV application, the DET boots up into that application. The set-top 100 will process the ATM cells and decode MPEG data carried in those cells in a manner similar to the processing of broadcast service cells, discussed above.

During the interactive communication session between the subscriber and the IMTV VIP, the set-top 100 can transmit control signalling upstream through the ONU 232, the HDT 230 and the X.25 data network to the level 2 gateway 260. The level 2 gateway 260 can also send signaling information, such as control data and text/graphics, downstream through the same path to the DET 238 or preferably as user data inserted in the MPEG II broadband data stream. For downstream transmission, the server 262 and/or an associated interworking unit (not shown) will provide ATM cells with an appropriate header. The ATM switch 250 will route the cells using the header and transmit those cells to the HDT 230 serving the requesting subscriber 236. The HDT 230 will recognize the header as currently assigned to the particular set-top 100 and will forward those cells through the downstream fiber and the ONU 232 to that set-top, in essentially the same manner as for broadcast programming.

When a session is first set up, the set-top 100 transmits an initial message identifying itself and identifying the current versions of various modules of the operating system the DET microprocessor is running. The level 2 gateway 262 examines the operating system module information and determines whether each module corresponds to the version necessary to run the particular VIP's application programs. For example, if the application programs call for version 1.1 of the graphics driver, those applications may not run properly on a DET still using version 1.0 of that module of the operating system. The identification of the operating system modules therefore permits the level 2 gateway 252 to determine if the DET 102 is running operating system modules compatible with the VIP's programs. The level 2 gateway may be able to download updated operating system software through the point-to-point connection using an appropriate bit-pattern signal corresponding to LOCK2 (FIG. 7), if this IMTVVIP is the party who originally provided the particular type of set-top terminal. If the level 2 gateway identifies one or more modules of the operating system needing to be changed to an earlier or later version thereof to achieve compatibility with the VIP's applications, the level 2 gateway will transmit an operating system rewrite code and the bit pattern through the signaling portion of the network to the microprocessor 110. Subsequent data received over the broadband channel is routed to the microprocessor 110 and used to rewrite appropriate portions of the operating system.

For a selected VIP's level 2 gateway without access to the operating system but requiring one or more module versions not currently resident in the non-volatile memory 121 in the DET 102, that level 2 gateway would instruct the DET to access a neutral third party level 2 gateway and server or to initiate an operating system download using a broadcast channel, to obtain the module(s) needed for compatibility with the selected VIP's service applications. The DET 102 would execute the operating system download, obtain the requisite operating system modules, and then initiate another session with the selected VIP's level 2 gateway and server.

If the operating system is compatible, the VIP's equipment 260, 262 will download application software to the DET 102. In the memory management illustration of FIG. 7, any L2 level 2 gateway 262 and associated server 260 can download application program software to the DRAM application memory in the DET. The downloaded applications software controls a wide variety of DET functions in accord with each VIP's services. For example, this software may specify the functionality of the user interface (UI), types of transactions to be performed, graphics styles, etc. Once all necessary software resides in memory in the DET, the user begins interaction with the services offered by the particular service provider or VIP.

The downloaded software from one service provider or VIP might present menus and prompts in simple text form. Another provider, however, might choose to present menus and prompts in a much more graphical form approaching virtual reality. One user interface for interactive services might emulate a shopping mall. The precise presentation to the user displayed on the television set is determined by the application software downloaded by the service provider and stored in the DET's system memory 120.

The Full Service Network illustrated in FIG. 8A and 8B will also provide narrowband transport for voice and narrowband data services. A digital switch or an analog switch (not shown) will provide standard type plain old telephone service (POTS) for customers of the Full Service Network. The digital POTS switch provides a DS1 type digital input/output port through interfaces conforming to either TR008 or TR303. The DS1 goes to the HDT 230. The DS1 may go through a digital cross-connect switch (DCS) for routing to the various HDT's or directly to a multiplexer (not shown) serving a particular HDT 230. The multiplexer may also receive telephone signals in DS1 format from an analog switch through a central office terminal. The central office terminal converts analog signals to digital and digital signals to analog as necessary to allow communication between the analog switch and the rest of the network.

Although not shown, the telephone service multiplexer for an HDT 230 may multiplex a number of DS1 signals for transmission over one fiber of an optical fiber pair to the HDT 230 and to demultiplex signals received over the other fiber of the fiber pair. The fiber pairs between the HDT 230 and the ONU's 232 will also have a number of DS1 channels to carry telephone and narrowband data signals to and from the subscriber's premises. In addition to the video services discussed above, the ONU 232 will provide telephone signals and appropriate power to the subscribers' premises over the twisted wire pairs 234 connected to subscribers' telephone sets 235.

Figure 9:
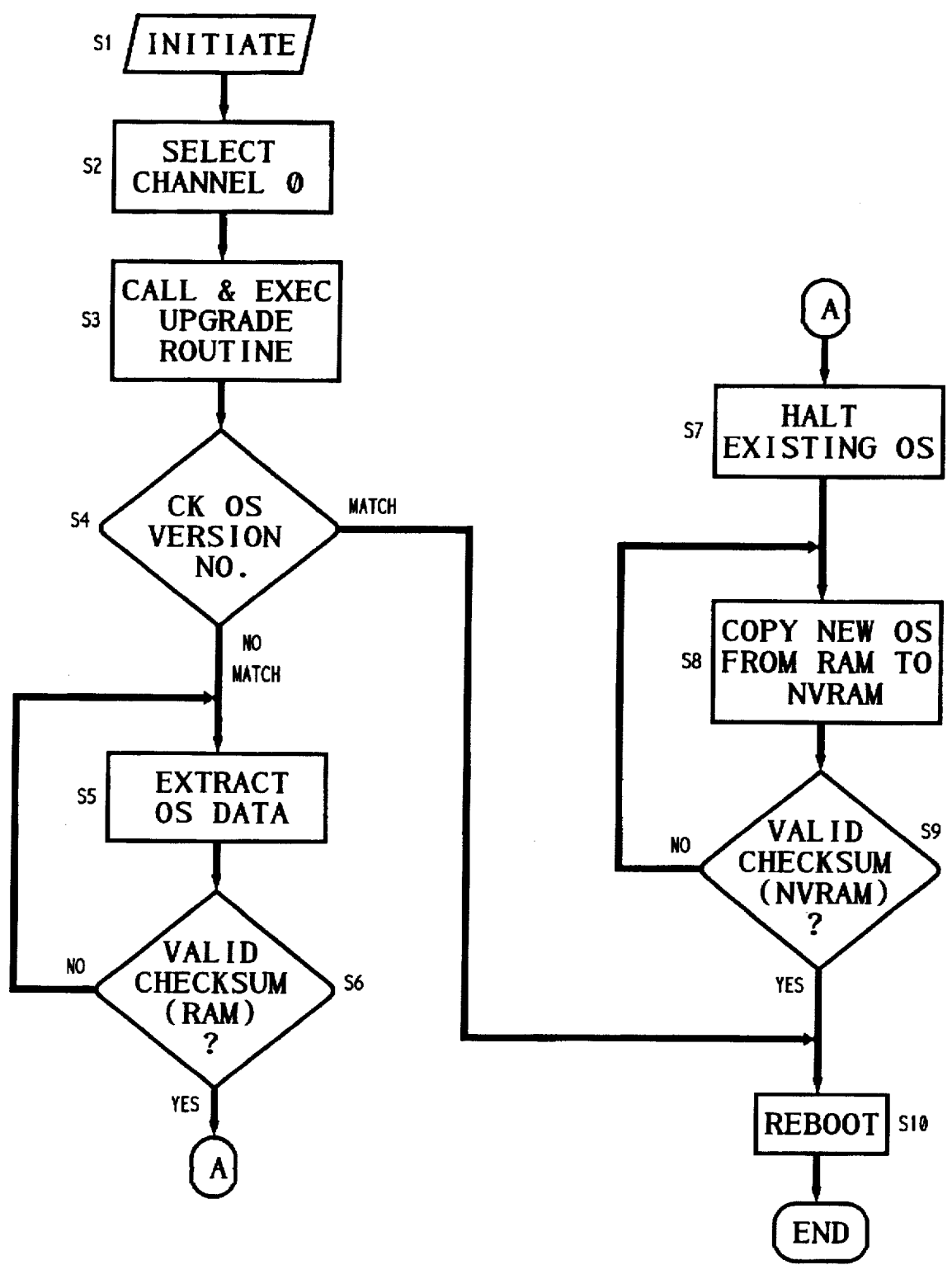
FIG. 9 is a flow chart illustrating an exemplary procedure for upgrading the operating system of the set-top terminal device using software downloaded through a broadcast channel.

A specific example of a procedure for a broadcast upgrade of the operating system in the DET 102 of FIG. 6 through the preferred network of FIGS. 8A and 8B will now be discussed with regard to the flow chart of FIG. 9.

The operating system upgrade can be initiated either automatically or manually. The DET microprocessor 110 may automatically check some time or cycle value, preferably the passage of a predetermined time interval (number of days). As another example, the DET microprocessor 110 could count the number of times the user turns off the terminal. The microprocessor will initiate the operating system upgrade routine after some specified number of power-off cycles. Alternatively, the user may execute a specified sequence of keystrokes on the remote control to call up a menu. One option on the menu is operating system upgrade. Manual selection of the operating system upgrade feature from the menu would trigger execution of the software upgrade routine.

Once initiated (step S1 in FIG. 9), the only difference in the two procedures is whether the DET provides on screen displays during the upgrade procedure. During a manually initiated procedure, the DET will output some form of 'Please Wait' message for display on the screen of the associated television set 103. During an upgrade procedure automatically initiated after a power-off input by the user, the output drivers of the DET 102 are off and there are no display messages unless the user turns the set-top back on before completion of the upgrade procedure.

When initiated, the DET 102 executes a normal channel selection (step S2) including the necessary interaction with the HDT to select and receive network logical channel 0. Once 'tuned'to channel 0, the DET microprocessor 110 calls and executes the upgrade routine from memory (step S3). The upgrade routine includes the information and instructions necessary to extract the operating system information from the MPEG data stream for the selected channel 0. As noted above, the operating system preferably is an OS-9 based operating system. The operating system upgrade routine, however, is an assembly language program and does not require any of the operating system capabilities to execute.

To receive channel 0, the set-top 100 interacts with the HDT 230 as discussed in detail above so that the HDT routes a DS3 containing channel 0 to the NIM 101. The NIM 101 executes ATM cell processing to capture the cells containing the VPI/VCI value assigned to channel 0 from that DS3 and to reconstruct the MPEG II packets from the payload data of those cells. Specifically, the NIM 101 reconstructs a 6 Mbits/s MPEG II transport stream containing the video and audio information for the program guide service as well as the data for the software downloading service and supplies that stream to the DET 102.

In a typical network operated over some substantial period of time, vendors will supply a number of different models of set-tops 100 for connection to the network. Some different types of set-tops will require different operating systems. In the preferred embodiment of the present invention, the software data carousel from server 12 contains operating system files for a plurality of different types of set-top terminal devices 100. Each DET produced by a different manufacturer would identify and capture a different operating system file contained in the repeating carousel transmission by a PID value assigned to that manufacturer's DET. The carousel will also include information identifying the version number for each type of set-top and identifying the appropriate PID value for the packets containing that operating system. Each type of DET would recognize when the version broadcast on the network is different from that running in the DET and utilize the assigned PID value to recognize and capture the operating system for that DET.

More specifically, the MPEG II standard defines a 'network' table which may be up to 256 characters in length. In accord with the present invention, the provider of the operating system download service would populate the network table with information identifying the operating system version number and the PMT PID value assigned to each type of set-top 100. The MPEG bit stream for channel 0 supplied to the DET 102 by the NIM 101 will contain a program association table identified by PID 0 as well as the network table. Part of the information in the program association table will identify the PID value for the network table.

After initiating execution of the upgrade routine (step S3), the DET 102 proceeds to check the version number for the particular type of set-top terminal 100 being broadcast in the carousel data stream (step S4). More specifically, the DET 102 captures the packet identified by PID 0. From the program association table in that packet, the DET 102 identifies the PID value for the network table. Using that PID value, the DET recognizes and captures the network table packet from the data stream. The DET microprocessor 110 examines the data in the network table associated with the particular type of set-top to identify the current operating system version number being broadcast for the particular type and/or model of set-top terminal. The system memory 120 also stores a version number for the operating system the DET microprocessor 110 is currently running. The DET microprocessor 110 compares the operating system version number in the network table with the operating system version number stored in its associated system memory 120 to determine whether or not they match. If they match, an operating system upgrade is not necessary at this time, and the processing routine is complete. Therefore processing branches to step S10; and the microprocessor reboots the existing operating system from NVRAM 121, executes the normal set of associated self-diagnostics, and completes the upgrade processing.

However, if in step S4 the version numbers do not match, then the DET proceeds to extract data, etc. to upgrade the operating system with the version currently being provided by the network (step S5). The version check decision as to whether or not to complete the upgrade works both backward and forward to conform the current version running in the DET 102 to the version offered on the network. The DET will proceed with the upgrade if the version number on the network is different from the currently stored version, whether the currently stored version number is lower (older) or higher (newer) than the number of the version on the network.

To perform the extraction step, the DET 102 needs the PID value for the packets containing the relevant operating system file. The data in the program map table identifies the PID value(s) for the packets containing the download data for the operating system upgrade. The necessary PID value may be stored in memory, either through signaling communication between the set-top 100 and the HDT 230 or as part of the upgrade routine. Alternatively, the DET 102 may store a program number and access the program association table (PID 0 packet) in the stream, to obtain the PID value for the program map. In the preferred embodiment, however, the DET 102 captures this information from the network table packet. More specifically, the DET microprocessor 110 processes the network table to identify the PID value assigned to the particular type and/or model of set-top terminal device. Using the relevant PID value from the network table packet, the MPEG demux 127 recognizes and captures the packets containing the operating system data file for the particular type of set-top 100 and forwards those packets to the DET microprocessor 110.

In the preferred embodiment, the data is formatted into individual blocks, one of which is identified as the start of the data file. The microprocessor 110 utilizes the 'start' indication to capture one copy of the entire data file in sequence in the RAM 122. Alternatively, the blocks could include a number identifying their location in the sequence, allowing the DET to capture blocks out of sequence, store the blocks and rearrange the blocks to compile the entire desired sequence.

The non-volatile RAM 121 comprises 1 Mbyte of memory, although sector 0 is write-protected and does not store a downloadable portion of the operating system. An MPEG II packet stream containing the operating system and associated overhead (packet headers, program map, etc.) may require 1 Mbyte of transport data. Transmission of such an operating system would require 8 Mbits of transmitted information. Assuming, as a simplified example, a 1 Mbits/s throughput rate for the downloading, the entire operating system file therefore requires 8 seconds to transmit. The transmission is continuously repeating. Assuming for a moment that only one operating system is repeating in the data carousel transmission, if the DET microprocessor attempts to capture the operating system just after the 'start' identifier, the microprocessor may have to wait almost an entire 8 seconds before receiving the 'start' identifier at the beginning of another repetition of the operating system transmission. Using a sequential acquisition beginning with the 'start' signal therefore could require as much as 16 seconds to complete, in the worst case.

The more operating systems carried on the data carousel application, the more time is required to cycle through the entire sequence of data files to capture the complete file desired. Continuing with the simplified example, if the broadcast carousel contained three operating system files of approximately the same size, the worst case time to capture the complete file might be 48 seconds.

The DET microprocessor 110 loads the captured operating system file into volatile RAM 122. The DET microprocessor 105 then performs a checksum operation on the data file to determine if there are any errors in the received data (step S6). If the checksum result is not valid, indicating errors in the extracted copy of the operating system stored in the RAM 122, then the microprocessor 110 returns to step S5 and again extracts the relevant operating system file from the broadcast carousel. Although the separate steps are not illustrated, the microprocessor 110 will repeat steps S5 and S6 up to some predetermined number of times. If extraction is not successful as indicated by a valid checksum in step S6 by the predetermined number of attempts, the microprocessor will terminate running of the upgrade routine and will reboot the existing operating system still stored in the NVRAM 121.

The operating system file downloaded through the network also includes a bit pattern code used to indicate that the data is a valid operating system for the particular type of set-top to use to upgrade the operating system. The upgrade routine stored in ROM 115 in the DET 102 will include this bit pattern code. As part of the checksum procedure S6 or as a separate step, the microprocessor 110 compares the bit pattern from the broadcast operating system now loaded in RAM 122 to the valid bit pattern stored in ROM 115. If the received code matches the stored code, then the microprocessor will proceed with the upgrade operation. If there is no match, the microprocessor may repeat the extraction procedure one or more times or terminate the upgrade routine.

If the checksum result in step S6 is valid (and the associated bit pattern check is valid), there are no errors in the extracted operating system, and the microprocessor 110 halts execution of the old operating system running from NVRAM 121 (step S7). Assuming that the non-volatile memory 121 is a flash memory, the running of the existing operating system is terminated by shutting down operation of the memory. Under control of the assembly language upgrade routine, the microprocessor 110 copies the operating system, sector by sector, from volatile RAM 122 into the flash memory non-volatile RAM 121 (step S8). In the currently preferred implementation, it takes approximately 30 seconds to write 1 Mbyte of flash memory.

As noted above with regard to FIG. 7, a specified bit pattern is needed to authorize overwriting of certain sectors of the flash memory 121. The operating system upgrade routine, preferably stored in ROM 115, includes the bit pattern needed to authorize overwriting of all sectors except sector 0. In operation, each sector of flash memory that is to be rewritten is erased, and new code is written into that sector from the RAM 122.

Once the operating system is fully loaded into the sectors of the flash memory, then the microprocessor executes another checksum operation (step S9). If the checksum operation produces a 'valid' result indicating no errors are present in the operating system now loaded into flash memory 121, the operating system has been successfully loaded, and the microprocessor 110 therefore initiates a reboot routine (step S10). As a result of the reboot, the microprocessor begins running the new operating system from the flash memory, and the upgrade procedure is complete.

In the disclosed operation, the microprocessor 110 attempts to write the operating system from the volatile RAM 122 to the non-volatile RAM 121 (flash memory) only if the checksum procedure executed after extraction of data from the broadcast (step S6) indicates reception and extraction of an error free copy of the operating system. The copy of the operating system in the RAM 122 therefore should be error free, and a failure to correctly write the operating system to the flash memory generally results from a temporary writing error. If the checksum following a write operation to the flash memory fails, then the microprocessor 110 returns to step S8 and attempts to reload the operating system into the flash memory 121 from the volatile RAM 122.

If the upgrade procedure began automatically after the user turned the set-top 100 'OFF', then the DET 102 returns to its low power stand-by state after reboot. If the upgrade procedure began as a result of the manual activation, then the DET 102 utilizes the last channel viewed data to resume audio/video output. Since the upgrade routine utilized a channel selection procedure for channel 0, the DET 102 will begin outputting the signals to display the audio/video information for the program guide from that channel.

As noted above, in a manually activated procedure, the DET will produce a 'Please Wait' type display on the associated television set 100. Although not shown as a step in the process of FIG. 9, this display to the user is initiated prior to bringing down the operating system. Specifically, while still running under the old operating system, the microprocessor 110 provides data through the graphics overlay controller 133 to fill the video RAM 135 with the desired display information. While the operating system is down and being rewritten, the contents of the video RAM 135 would remain unchanged and cause the display to persist on the output to the associated television 103.

When the reboot operation is complete, the DET begins execution of the new operating system. As a result, the DET will replace the 'wait' display with new video information from the last selected channel. In the present circumstances, the last channel selected through an interaction with the HDT was channel 0. However, since the DET is now running the operating system instead of the software upgrade program, the DET will search for and decode packets containing audio and video information, in the normal manner, and ignore packets having PID values associated with data. After the reboot, the DET therefore will begin displaying video from that same channel, albeit by processing the video and audio packets from the MPEG stream. As noted above, the actual video and audio on this channel preferably relate to a program guide service.

As noted above, when the user turns the box 'OFF', the microprocessor 110 turns off the various output drivers thereby terminating the television display functionality. To the user, the set-top 100 appears off. The microprocessor 110, however, remains powered and as part of its self-diagnostic routine can determine whether or not an operating system upgrade is necessary. If an upgrade is automatically initiated, e.g. after 10 'OFF' cycles by user command, the set-top 100 can interact with the HDT 230, check the network operating system version number for the particular type of set-top and execute the operating system upgrade procedure as discussed above, without the user being aware. If the user turns the set-top 100 'ON' during the automatic upgrade procedure, the DET 102 will provide the please wait display, complete the upgrade procedure and boot up in the new operating system.

While this invention has been described in connection with what is presently considered to be the preferred embodiments, it is to be understood that the invention is not limited to the disclosed embodiments, but, on the contrary, is intended to cover various modifications and equivalent arrangements included within the spirit and scope of the appended claims.

We claim:

1. A set-top terminal device comprising:

a network interface module adapted to couple the terminal to a communication network for receiving at least selected ones of a plurality of broadcast digital broadband channels at least one of which carries audio/video program information in compressed, digital form in packets of a standardized format and at least one of which carries cyclically repetitive transmissions of operating system software in packets of the standardized format, wherein said network interface module receives an Asynchronous Transfer Mode (ATM) cell stream and extracts packets of the standardized format from payloads of ATM cells; and a digital entertainment terminal comprising:

(a) an audio/video processor responsive to at least some of the packets extracted by the network interface module for processing the compressed, digital audio/video program information;

(b) a memory;

(c) means for receiving inputs from a user; and (d) a control processor controlling operations of the set-top terminal;

wherein said control processor captures said operating system software from at least some of the packets extracted by the network interface module for one of the selected digital broadband channels within a transmission cycle, loads the captured operating system software into the memory and begins operation in accord with the operating system software loaded into the memory, said control processor controlling the network interface module and the audio/video processor in response to the user inputs in accord with the operating system software loaded in said memory.

2. A device as recited in claim 1, wherein said memory comprises a non-volatile random access memory.

3. A device as recited in claim 2, wherein said non-volatile random access memory comprises a flash memory.

4. A device as recited in claim 1, wherein said digital entertainment terminal further comprises a random access memory storing applications software for use by said control processor while running the operating system software.

5. A device as recited in claim 1, wherein said audio/video processor comprises:

an audio decoder for decoding compressed, digital audio information;

a video decoder for decoding compressed, digital video information; and a packet demultiplexer for analyzing packet identifiers contained in the packets of the standardized format to identify packets containing compressed, digital audio information and to route information from those packets to the audio decoder, to identify packets containing compressed, digital video information and to route information from those packets to the video decoder, and to identify packets containing operating system software and route software from those packets to the control processor.

6. A device as recited in claim 5, wherein:

the audio decoder comprises an MPEG audio decoder;

the video decoder comprises an MPEG video decoder; and the packet demultiplexer is an MPEG demultiplexer.

7. A device as recited in claim 5, wherein said network interface module supplies the extracted packets to the packet demultiplexer.

8. A device as recited in claim 1, wherein said digital entertainment terminal further comprises a memory storing a routine which the control processor executes to control capturing of the operating system software.

9. A communication system comprising:

a source system comprising:

(a) a program source supplying a broadband program signal, (b) a software server cyclically outputting a data file containing an operating system, and (c) an encoder system for packetizing the broadband program signal and the data file in digital packets of a standard format, wherein said encoder system comprises an encoder for digitizing and compressing the broadband program signal into program data and encapsulating the program data in a sequence of packets of the standard format, a data module for encapsulating the data file containing an operating system in a sequence of packets of the standard format, and an Asynchronous Transfer Mode (ATM) multiplexer for combining the packets containing the broadband program information and the packets containing the data file into a single stream for broadcast through the network on a single one of the channels;

a digital network broadcasting a plurality of digital broadband channels, said digital network receiving and broadcasting the digital packets from the encoder system on at least one of the channels; and a plurality of set-top terminal devices, each set-top terminal device comprising:
(1) an interface coupled to the digital network for receiving at least a selected one of the channels, selectively including at least one channel carrying packets containing the broadband program information, and at least one channel carrying packets containing the operating system data file;
(2) a program signal processor for processing the packets containing the broadband program information;
(3) a memory;
(4) means for receiving inputs from a user; and
(5) a control processor controlling operations of the set-top terminal;

wherein said control processor captures said operating system data file from a selected one of the digital broadband channels, loads the captured operating system into the memory and begins operation in accord with the operating system loaded into the memory, said control processor controlling the interface and the program signal processor in response to the user inputs in accord with the operating system loaded in said memory.

10. A communication system as recited in claim 9, wherein said encoder for digitizing and compressing the broadband program signal comprises a real time encoder for digitizing and compressing an audio/video program signal.

11. A communication system as recited in claim 10, wherein said real time encoder comprises an MPEG encoder.

12. A communication system as recited in claim 9, wherein said digital network comprises:
a first optical fiber receiving the digital packets from the encoder system;
a second optical fiber receiving packets containing broadband program information from another source system;
a system of optical fibers for broadcasting the digital packets from the encoder system on at least a first one of the channels and for broadcasting the packets containing the broadband program information from another source on at least a second one of the channels; and
a plurality of host digital terminals each coupled between the system of optical fibers and a group of the set-top terminals for routing selected ones of the channels to set-top terminals in each group.

13. In a digital network broadcasting packetized audio/video program information through a plurality of digital broadband channels to a plurality of digital terminals connected to the network, a method comprising the steps of:
cyclically broadcasting an operating system together with predetermined identification data relating to the operating system on one digital broadband channel;
selectively receiving the one digital broadband channel and capturing the predetermined identification data;
comparing the captured predetermined identification data to identification data stored in one of the digital terminals;
based on the results of the comparison, capturing a copy of the operating system from the cyclical broadcast;
initiating operating of the one digital terminal in accord with the captured copy of the operating system;

receiving and storing application software in the one digital terminal via a digital communication link through the network; and
executing the application software under control of the captured copy of the operating system.

14. A method as recited in claim 13, wherein the predetermined identification data identifies a terminal type, and the operating system is stored if the terminal type identified by the predetermined identification data matches terminal type identification data stored in the one terminal.

15. A method as recited in claim 13, wherein the predetermined identification data identifies a version number of the operating system being broadcast, and the operating system is stored if the version number identified by the predetermined identification data is different from a version number of an operating system previously stored in the one terminal.

16. A method as recited in claim 13, wherein the operating system comprises:
a microprocessor operating system;
at least one driver routine used by a microprocessor to control components of a terminal; and
a resident application controlling at least selection of channels through the network in response to user inputs.

17. A method as recited in claim 13, wherein the digital communication link comprises one of the digital broadband channels.

18. A method as recited in claim 13, wherein the digital communication link comprises a broadband point-to-point link.

19. A method comprising:
encoding a plurality of broadband program information signals as digitized, compressed data in packet streams of a standard format;
cyclically generating a first data file containing an operating system comprising code executable by a first type of terminal and a data file containing an operating system comprising code executable by a second type of terminal different in type from the first type of terminal;
forming a sequence of packets in the standard format including: packets containing the first data file and a first identifier, packets containing the second data file and a second identifier, and at least one packet containing data associating the first and second identifiers with the first and second types of terminal, respectively;
broadcasting the packet streams and the sequence of packets on a plurality of multiplexed channels;
in a receiving terminal of a predetermined type:
  (a) selectively receiving a channel carrying the sequence of packets;
  (b) capturing said at least one packet;
  (c) identifying the first type of terminal or the second type of terminal as corresponding to the predetermined type of the receiving terminal;
  (d) recognizing the first or second identifier as associated with the identified terminal type;
  (e) using the recognized identifier to capture a copy of the operating system for the identified terminal type from the sequence of packets; and
  (f) executing at least a portion of the code from the captured copy of the operating system for the identified terminal type to initiate operation of the receiving terminal, the operation of the receiving terminal including reception of a user selected channel carrying a packet stream and processing digitized, compressed data from that packet stream to present broadband program information to a user in humanly perceptible form.

20. A method as recited in claim 19, wherein:

the step of using the recognized identifier to capture a copy of the operating system comprises storing payload data from packets containing the recognized identifier in random access memory; and the step of initiating operation comprises transferring the payload data from the random access memory to a non-volatile memory, and booting up the receiving terminal from the payload data in the nonvolatile memory.

21. A method as recited in claim 19, further comprising encoding another broadband program information signal as digitized, compressed data in another packet stream of a standard format, wherein the step of broadcasting comprises:

multiplexing the sequence of packets and said another packet stream into one channel stream, and broadcasting the one channel stream through one of the multiplexed channels.

22. A method comprising:

encoding a plurality of broadband program information signals as digitized, compressed data in packet streams of a standard format;

cyclically generating a first data file containing an operating system for a first type of terminal and a data file containing an operating system for a second type of terminal;

forming a sequence of packets in the standard format including: packets containing the first data file and a first identifier, packets containing the second data file and a second identifier, and at least one packet containing data associating the first and second identifiers with the first and second types of terminal, respectively;

broadcasting the packet streams and the sequence of packets on a plurality of multiplexed channels, wherein the multiplexed channels comprise Asynchronous Transfer Mode (ATM) virtual circuits, each virtual circuit being identified by a different virtual path identifier/virtual circuit identifier (VPI/VCI) value;

in a receiving terminal of a predetermined type:

(a) selectively receiving a channel carrying the sequence of packets;

(b) capturing said at least one packet;

(c) identifying the first type of terminal or the second type of terminal as corresponding to the predetermined type of receiving terminal;

(d) recognizing the first or second identifier as associated with the identified terminal type;

(e) using the recognized identifier to capture a copy of the operating system for the identified terminal type from the sequence of packets; and (f) initiating operation of the receiving terminal in accord with the captured copy of the operating system for the identified terminal type, operation of the receiving terminal including reception of a user selected channel carrying a packet stream and processing digitized, compressed data from that packet stream to present broadband program information to a user in humanly perceptible form.

23. A method as recited in claim 22, wherein the step of selectively receiving a channel comprises receiving and processing ATM cells containing a VPI/VCI value assigned to the selectively received channel.

24. A method comprising:

encoding a plurality of broadband program information signals as digitized, compressed data in packet streams of a standard format;

cyclically generating a first data file containing an operating system comprising code executable by a first type of terminal and a data file containing an operating system comprising code executable by a second type of terminal different in type from the first type of terminal;

forming a sequence of packets in the standard format including: packets containing the first data file and a first identifier, packets containing the second data file and a second identifier, and at least one packet containing data associating the first and second identifiers with the first and second type of terminal and first and second operating system version numbers, respectively;

broadcasting the packet streams and the sequence of packets on a plurality of multiplexed channels;

in a receiving terminal of a predetermined type:

selectively receiving a channel carrying the sequence of packets;

capturing said at least one packet;

from the data in said at least one packet, identifying the first type of terminal or the second type of terminal as corresponding to the predetermined type of the receiving terminal;

from the data in said at least one packet, identifying the version number for the identified terminal type;

if the identified version number differs from a version number of an operating system previously stored in the receiving terminal, recognizing the first or second identifier as associated with the identified terminal type and using the recognized identifier to capture a copy of the operating system for the identified terminal type from the sequence of packets; and executing at least a portion of the code from the captured copy of the operating system for the identified terminal type to initiate operation of the receiving terminal, the operation of the receiving terminal including reception of a user selected channel carrying a packet stream and processing digitized, compressed data from that packet stream to present broadband program information to a user in humanly perceptible form.

25. A method as recited in claim 24, wherein:

the step of using the recognized identifier to capture a copy of the operating system comprises storing payload data from packets containing the recognized identifier in random access memory; and the step of initiating operation comprises transferring the payload data from the random access memory to a non-volatile memory, and booting up the receiving terminal from the payload data in the non-volatile memory.

26. A method as recited in claim 24, further comprising encoding another broadband program information signal as digitized, compressed data in another packet stream of a standard format, wherein the step of broadcasting comprises:

multiplexing the sequence of packets and said another packet stream into one channel stream, and broadcasting the one channel stream through one of the multiplexed channels.

27. A method comprising:

encoding a plurality of broadband program information signals as digitized, compressed data in packet streams of a standard format;

cyclically generating a first data file containing an operating system for a first type of terminal and a data file containing an operating system for a second type of terminal;

forming a sequence of packets in the standard format including: packets containing the first data file and a first identifier, packets containing the second data file and a second identifier, and at least one packet containing data associating the first and second identifiers with the first and second type of terminal and first and second operating system version numbers, respectively;

broadcasting the packet streams and the sequence of packets on a plurality of multiplexed channels, wherein the multiplexed channels comprise Asynchronous Transfer Mode (ATM) virtual circuits, each virtual circuit being identified by a different virtual path identifier/virtual circuit identifier (VPI/VCI) value;

in a receiving terminal of a predetermined type:

selectively receiving a channel carrying the sequence of packets;

capturing said at least one packet;

from the data in said at least one packet, identifying the first type of terminal or the second type of terminal as corresponding to the predetermined type of receiving terminal;

from the data in said at least one packet, identifying the version number for the identified terminal type;

if the identified version number differs from a version number of an operating system previously stored in the receiving terminal, recognizing the first or second identifier as associated with the identified terminal type and using the recognized identifier to capture a copy of the operating system for the identified terminal type from the sequence of packets; and initiating operation of the receiving terminal in accord with the captured copy of the operating system for the identified terminal type, operation of the receiving terminal including reception of a user selected channel carrying a packet stream and processing digitized, compressed data from that packet stream to present broadband program information to a user in humanly perceptible form.

28. A method as recited in claim 27, wherein the step of selectively receiving a channel comprises receiving and processing ATM cells containing a VPI/VCI value assigned to the selectively received channel.

29. A method comprising:

selectively receiving in a terminal an Asynchronous Transfer Mode (ATM) digital broadcast channel identified by a virtual path identifier/virtual circuit identifier (VPI/VCI) value and carrying a digital transport stream of packets;

capturing at least one packet of data from the digital transport stream;

from the data in said at least one packet, identifying a version number for an operating system carried in the digital transport stream;

if the identified version number differs from a version number of an operating system previously stored in the terminal, capturing the operating system from the transport stream; and initiating operation of the terminal in accord with the captured copy of the operating system, operation of the terminal including reception of a user selected ATM channel and processing digitized, compressed data from the user selected ATM channel to present broadband program information to a user in humanly perceptible form.

30. A method as recited in claim 29 further comprising the step of initiating the method in response to a predetermined user input.

31. A method as recited in claim 29, further comprising the step of automatically initiating the method in response to a predetermined event.

32. A method as received, in claim 31, wherein the predetermined event is passage of a specified time period.

33. A method as received in claim 31, wherein the predetermined event comprises turn-off of the terminal.

34. A method as recited in claim 29, further comprising the steps of:

counting each occurrence of an 'off' instruction input to the terminal from a user; and when the count reaches a predetermined value, initiating the method.

35. A communication system comprising:

a source system supplying a broadband program signal, and a cyclically repeating data file containing an operating system, said broadband program signal and the data file being encoded in digital packets of a standard format;

an Asynchronous Transfer Mode (ATM) digital network broadcasting a plurality of digital broadband channels in virtual circuits, each virtual circuit being identified by a different virtual path identifier/virtual circuit identifier (VPI/VCI) value, said digital network receiving and broadcasting the digital packets from the source system on at least one of the channels; and a plurality of set-top terminal devices, each set-top terminal device comprising:

(1) an interface coupled to the digital network for receiving at least a selected one of the channels, selectively including at least one channel carrying packets containing the broadband program information, and at least one channel carrying packets containing the operating system data file;

(2) a program signal processor for processing the packets containing the broadband program information;

(3) a memory;

(4) means for receiving inputs from a user; and (5) a control processor controlling operations of the set-top terminal;

wherein said control processor captures said operating system data file from a selected one of the digital broadband channels, loads the captured operating system into the memory and begins operation in accord with the operating system loaded into the memory, said control processor controlling the interface and the program signal processor in response to the user inputs in accord with the operating system loaded in said memory.

36. A communication system as recited in claim 35, wherein said source system comprises:

an encoder for digitizing and compressing the broadband program signal into program data and encapsulating the program data in a sequence of packets of the standard format; and a data module for encapsulating the data file containing an operating system in a sequence of packets of the standard format.

37. A communication system as recited in claim 36, wherein said source system further comprises a multiplexer for combining the packets containing the broadband program information and the packets containing the data file into a single stream for broadcast through the network on a single one of the channels.

38. A set-top terminal device comprising:

a network interface module adapted to couple the terminal to a communication network for receiving at least selected ones of a plurality of broadcast digital broadband channels at least one of which carries audio/video program information in compressed, digital form in packets of a standardized format and at least one of which carries cyclically repetitive transmissions of operating system software in packets of the standardized format; and a digital entertainment terminal comprising:
  (a) an audio/video processor for processing the compressed, digital audio/video program information;
  (b) an operating system memory;
  (c) a random access memory;
  (d) means for receiving inputs from a user; and
  (e) a control processor controlling operations of the set-top terminal, wherein said control processor captures said operating system software from one of the selected digital broadband channels within a transmission cycle, loads the captured operating system software into the operating system memory and begins operation in accord with the operating system software loaded into the operating system memory, said control processor captures application software received through the network interface module, stores captured application software in the random access memory and executes the stored application software under control of the captured copy of the operating system, and said control processor controls the network interface module and the audio/video processor in accord with the operating system software loaded in said operating system memory, and controls at least some responses to the user inputs with the application software.

39. A device as recited in claim 38 wherein said audio/video processor comprises:

an audio decoder for decoding compressed, digital audio information;

a video decoder for decoding compressed, digital video information; and a packet demultiplexer for analyzing packet identifiers contained in the packets of the standardized format to identify packets containing compressed, digital audio information and to route information from those packets to the audio decoder, to identify packets containing compressed, digital video information and to route information from those packets to the video decoder, and to identify packets containing operating system software and application software and route software from those packets to the control processor.

40. A device as recited in claim 39, wherein:

the audio decoder comprises an MPEG audio decoder;

the video decoder comprises an MPEG video decoder; and the packet demultiplexer is an MPEG demultiplexer.

41. A device as recited in claim 39, wherein said network interface module receives an Asynchronous Transfer Mode (ATM) cell stream, extracts packets of the standardized format from payloads of ATM cells and supplies the extracted packets to the packet demultiplexer.

42. A communication system comprising:
a source'system comprising:
  (a) a program source supplying a broadband program signal,
  (b) a software server cyclically outputting a data file containing an operating system, and
  (c) an encoder system for packetizing the broadband program signal and the data file in digital packets of a standard format;

a digital network broadcasting a plurality of digital broadband channels, said digital network receiving and broadcasting the digital packets from the encoder system on at least one of the channels and transporting an application program through at least one digital broadband channel; and a plurality of set-top terminal devices, each set-top terminal device comprising:
  (1) an interface coupled to the digital network for receiving at least a selected one of the channels,
  (2) a program signal processor for processing packets containing the broadband program information received through the interface,
  (3) an operating system memory,
  (4) a random access memory for storing the application program when received through the interface,
  (5) means for receiving inputs from a user, and
  (5) a control processor controlling operations of the set-top terminal, wherein said control processor captures said operating system data file from a selected one of the digital broadband channels, loads the captured operating system into the memory and begins operation in accord with the operating system loaded into the memory, said control processor executing the application program from the random access memory and controlling the interface and the program signal processor in accord with the operating system loaded in said memory and controlling at least some responses to user inputs in accord with the application program.

43. A communication system as recited in claim 42, wherein said encoder system further comprises a multiplexer for combining the packets containing the broadband program information and the packets containing the data file into a single stream for broadcast through the network on a single one of the channels.

44. A communication system as recited in claim 43, wherein said multiplexer is an Asynchronous Transfer Mode (ATM) multiplexer.

45. A communication system as recited in claim 44, wherein said digital network comprises:

a first optical fiber receiving the digital packets from the encoder system;

a second optical fiber receiving packets containing broadband program information from another source system;

a system of optical fibers for broadcasting the digital packets from the encoder system on at least a first one of the channels and for broadcasting the packets containing the broadband program information from another source on at least a second one of the channels; and a plurality of host digital terminals each coupled between the system of optical fibers and a group of the set-top terminals for routing selected ones of the channels to set-top terminals in each group.

* * * * *